United States Patent
Kore

(10) Patent No.: US 7,434,833 B2
(45) Date of Patent: Oct. 14, 2008

(54) SEAT BELT DEVICE FOR VEHICLE

(75) Inventor: Haruhisa Kore, Hiroshima (JP)

(73) Assignee: Mazda Motor Corporation (JP)

( * ) Notice: Subject to any disclaimer, the term of this patent is extended or adjusted under 35 U.S.C. 154(b) by 521 days.

(21) Appl. No.: 11/167,753

(22) Filed: Jun. 28, 2005

(65) Prior Publication Data

US 2006/0012159 A1    Jan. 19, 2006

(30) Foreign Application Priority Data

| Jul. 14, 2004 | (JP) | ............................. 2004-207579 |
| Jul. 14, 2004 | (JP) | ............................. 2004-207581 |
| Jul. 14, 2004 | (JP) | ............................. 2004-207582 |
| Jul. 15, 2004 | (JP) | ............................. 2004-208393 |
| Jul. 21, 2004 | (JP) | ............................. 2004-213233 |

(51) Int. Cl.
B60R 21/18 (2006.01)

(52) U.S. Cl. ........................................ 280/733; 280/805

(58) Field of Classification Search ................ 280/733, 280/741, 805, 806, 807
See application file for complete search history.

(56) References Cited

U.S. PATENT DOCUMENTS

| 3,844,581 | A | * | 10/1974 | Fox ............................. 280/733 |
| 3,848,887 | A | * | 11/1974 | Fox ............................. 280/733 |
| 3,869,145 | A | * | 3/1975 | Takada ........................ 280/733 |
| 5,069,478 | A | * | 12/1991 | Kim ............................. 280/733 |
| 5,466,002 | A | * | 11/1995 | Tanaka et al. ................ 280/733 |
| 5,474,326 | A |   | 12/1995 | Cho |
| 5,607,180 | A | * | 3/1997 | Kornhauser .................. 280/736 |
| 5,765,869 | A | * | 6/1998 | Huber ......................... 280/807 |
| 5,925,084 | A |   | 7/1999 | Gotoh |
| 6,170,863 | B1 | * | 1/2001 | Takeuchi et al. ............. 280/733 |
| 6,237,945 | B1 | * | 5/2001 | Aboud et al. ................ 280/733 |
| 6,256,565 | B1 |   | 7/2001 | Yanagi et al. |
| 6,286,860 | B1 | * | 9/2001 | Adomeit et al. ............. 280/733 |
| 6,340,173 | B1 | * | 1/2002 | Specht ........................ 280/733 |
| 6,378,898 | B1 | * | 4/2002 | Lewis et al. .................. 280/733 |

(Continued)

FOREIGN PATENT DOCUMENTS

JP    06-286581    10/1994

(Continued)

OTHER PUBLICATIONS

European Search Report dated Oct. 18, 2005.

Primary Examiner—Kevin Hurley
Assistant Examiner—Barry Gooden, Jr.
(74) Attorney, Agent, or Firm—Studebaker & Brackett PC; Donald R. Studebaker

(57) ABSTRACT

There is provided a seat belt device for a vehicle, comprising bag portions and provided at seat belts and for protecting an occupant, a blower device to repeatedly supply the inflation air to the bag portions, air supply passages and connecting the bag portions with the blower device, and an air supply control device to supply the inflation air from the blower device to the bag portions so as to inflate the bag portions and discharge the supplied air from the bag portions so as to return the bag portions to deflated initial states. Accordingly, the occupant can be restrained to the properly large extent, thereby with the properly dispersed restraint force, and the inflation operation of the bag portion can be reused at need.

26 Claims, 27 Drawing Sheets

U.S. PATENT DOCUMENTS

| | | | |
|---|---|---|---|
| 6,460,881 B1 * | 10/2002 | Adomeit | 280/733 |
| 6,502,856 B1 * | 1/2003 | Shaklik et al. | 280/735 |
| 6,513,602 B1 * | 2/2003 | Lewis et al. | 169/84 |
| 6,648,369 B2 * | 11/2003 | Mishima et al. | 280/733 |
| 7,258,188 B2 * | 8/2007 | Chernoff et al. | 180/268 |

FOREIGN PATENT DOCUMENTS

| | | |
|---|---|---|
| JP | 11-348720 | 12/1999 |
| JP | 2000-211461 | 8/2000 |

* cited by examiner

FIG. 14

|  | Frontal Crash | Side-Crash/ Rollover | Rear Crash |
|---|---|---|---|
| Normal Position | S>R | S<R | S=R |
| forward-leaning/ front-portion sitting position | S>>R | S=R | S>R |
| rearward-leaning sitting position | S=R | S<<R | S<R |

|  | Frontal Crash | Side-Crash/Rollover | Rear Crash |
|---|---|---|---|
| Normal Position | S>R | S<R | S=R |
| forward-leaning/front-portion sitting position | S>>R | S=R | S>R |
| rearward-leaning sitting position | S=R | S<<R | S<R |

FIG. 32

|  | Quick Braking & Handling | Quick Braking | Quick Handling | Normal Mode |
|---|---|---|---|---|
| Normal Position | S=R | S>R | S<R | S,R=0 |
| forward-leaning/ front-portion sitting position | S>R | S>>R | S=R | S,R=0 |
| rearward-leaning sitting position | S<R | S=R | S<<R | S,R=0 |

SEAT BELT DEVICE FOR VEHICLE

BACKGROUND OF THE INVENTION

The present invention relates to a seat belt device for a vehicle comprising an inflatable bag portion which is provided at a seat belt for protecting an occupant and adapted to receive inflation air.

Conventionally, an air belt device for an automotive vehicle, in which a chamber is provided at the seat belt for protecting the occupant (passenger) on the vehicle and the like and there are provided a gas supply device to supply gas to the chamber and a detecting device to detect a vehicle crash state, wherein the gas is supplied to the chamber of the seat belt during the vehicle crash or the like, thereby inflating the seat belt, is known as shown in, for example, Japanese Patent Laid-Open Publication No. 2000-211461.

The above-described seat belt device has an advantage that the restraint force for the occupant which is generated by the seat belt for the occupant is so dispersed to a large extent that a too-large restraint force can be prevented from acting on the occupant partially. Namely, when the vehicle crash is detected, the gas supply device comprising an inflator is operated and supplies the gas into the chamber of the seat belt to inflate the seat belt. Meanwhile, there is a problem (disadvantage) that the inflator is generally not reused and thus once the inflator operates, it can not be reused. Accordingly, the determination of the inflation timing of the inflator needs to be conducted very carefully. Namely, if the inflator was operated at the timing a high likelihood of an occurrence of vehicle crash was detected, the inflator could not reused after that even though the vehicle crash had been avoided. Meanwhile, if the inflator was not operated until the real vehicle crash occurred, the proper protection of the occupant could not attained with the best inflation timing just before the real vehicle crash.

SUMMARY OF THE INVENTION

The present invention has been devised in view of the above-described problem, and an object to the present invention is to provided a seat belt device for a vehicle which enables the reuse of the occupant protection function by the seat belt, preventing the too-large restraint force from acting on the occupant partially.

According to the present invention, there is provided a seat belt device for a vehicle, comprising an inflatable bag portion provided at a seat belt for protecting an occupant and adapted to receive inflation air, a blower device operative to repeatedly supply the inflation air to the bag portion, an air supply passage connecting the bag portion with the blower device, and an air supply control device operative to supply the inflation air from the blower device to the bag portion so as to inflate the bag portion and discharge the supplied air from the bag portion so as to return the bag portion to a deflated initial state, whereby an inflation operation of the inflatable bag portion can be reused.

According to the present invention, since the inflation air is provided to the bag portion provided at the seat belt and the bag portion of the seat belt is inflated, the occupant can be restrained to the properly large extent, thereby with the properly dispersed restraint force. Also, since the inflation air can be repeatedly supplied and the bag portion can be inflated again after the inflation air in the bag portion which has been previously provided is discharged, the inflation operation of the bag portion can be reused at need.

According to a preferred embodiment of the present invention, there is further provided a detecting device operative to detect a high likelihood of an occurrence of vehicle crash, wherein the inflation air is supplied to the bag portion to inflate the bag portion when the high likelihood of the occurrence of vehicle crash is detected by the detecting device. Accordingly, the bag portion can be inflated at the proper timing and thereby the occupant protection can be attained appropriately.

According to further another preferred embodiment of the present invention, there is further provided a valve which is provided at the air supply passage, and a valve control device operative to control the valve so as to open and shut the air supply passage according to a control condition. Accordingly, since the valve shuts the air supply passage at a specified (predetermined or predeterminable) close timing after the inflation air has been supplied to the bag portion according to the operation of the blower device, the inflation state of the bag portion can be maintained stably. Also, since the valve opens at a specified (predetermined or predeterminable) open timing, the air provided in the bag portion can be discharged and thereby the bag portion can be returned to the deflated initial state to prepare for the next inflation operation.

According to further another preferred embodiment of the present invention, the valve is controlled so as to shut the air supply passage when a specified supply period of time has passed after a supply of the inflation air to the bag portion had started. Accordingly, since the valve shuts the air supply passage when the specified (predetermined or predeterminable) supply period of time has passed after the inflation air supply to the bag portion had started and thus the proper inflation state established has been confirmed, the stable inflation state of the bag portion of the seat belt can be maintained.

According to further another preferred embodiment of the present invention, there is further provided a pressure sensor to detect an air pressure in the bag portion, wherein the valve is controlled so as to shut the air supply passage when the pressure sensed by the pressure sensor has reached a specified pressure after a supply of the inflation air to the bag portion had started. Accordingly, since the valve shuts the air supply passage when the pressure in the bag portion has reached the specified (predetermined or predeterminable) pressure after the inflation air supply to the bag portion had started and thus the proper inflation state established has been confirmed, the stable inflation state of the bag portion of the seat belt can be maintained.

According to further another preferred embodiment of the present invention, there is further provided a vehicle-crash detecting device operative to detect a real occurrence of vehicle crash, wherein the valve is controlled so as to shut the air supply passage when the real occurrence of vehicle crash has been detected by the vehicle-crash detecting device after a supply of the inflation air to the bag portion had started. Accordingly, since the valve shuts the air supply passage when the real occurrence of vehicle crash has been detected by the vehicle-crash detecting device after the inflation air supply to the bag portion had started, the air in the bag portion can be prevented from leaking during the occurrence of the vehicle crash and thereby the stable inflation state of the bag portion of the seat belt can be maintained.

According to further another preferred embodiment of the present invention, after the inflation air has been supplied to the bag portion, a pressure of the inflation air in the bag portion is adjusted to a specified pressure value. Accordingly, since the inflation air pressure is adjusted to a proper pressure after the inflation air has been supplied to the bag portion, the bag portion of the seat belt can be inflated properly.

According to further another preferred embodiment of the present invention, the blower device comprises a blower resource operative to pressure air and provide the inflation air and an accumulator operative to accumulate the pressured inflation air, and the pressured inflation air in the accumulator is supplied to the bag portion when the high likelihood of the occurrence of vehicle crash is detected by the detecting device. Accordingly, since the pressured air is supplied to the bag portion of the seat belt from the accumulator when the high likelihood of the occurrence of vehicle crash is detected, the inflation air can be supplied to the bag portion promptly and thereby the prompt inflation of the bag portion of the seat belt can be attained.

According to further another preferred embodiment of the present invention, the pressure of the inflation air supplied to the bag portion from the blower device is adjusted according to a vehicle state. Accordingly, since the inflation air pressure is adjusted according to the vehicle state, the inflation of the bag portion can be adjusted properly according to the crash impact force or the like during the vehicle crash, and thereby the occupant can be protected effectively.

According to further another preferred embodiment of the present invention, when there occurs no real vehicle crash within a specified period of time after the inflation air is supplied to the bag portion, the supplied air is discharged from the bag portion so as to return the bag portion to the deflated initial state. Accordingly, since the supplied air is discharged from the bag portion so as to return the bag portion to the deflated initial state when the avoidance of the vehicle crash is confirmed by detecting no occurrence of the real vehicle crash within the specified (predetermined and predeterminable) period of time after the inflation air is supplied to the bag portion, the seat belt can be returned to the normal use state.

According to further another preferred embodiment of the present invention, at least when the seat belt applied to the occupant is removed or an ignition key switch of the vehicle is turned off, the supplied air is discharged from the bag portion so as to return the bag portion to the deflated initial state. Accordingly, since the supplied air is discharged from the bag portion and the bag portion is returned to the deflated initial state when the seat belt applied to the occupant is removed or the ignition key switch of the vehicle is turned off, the seat belt can be returned to its initial state automatically.

According to further another preferred embodiment of the present invention, the bag portion comprises a plurality of bags which are provided so as to extend in a longitudinal direction of the seat belt respectively and be separate from each other in a width direction of the seat belt. Accordingly, since the bags with the inflation air are provided so as to be separate from each other with a specified distance in the width direction of the seat belt, the total volume of the bag portion with the inflation air can be reduced, compared with a bag portion which is disposed over the entire area of the seat belt. Thus, the bag portion can be inflated as quickly as possible. Also, since the plural bags are provided so as to extend in the width direction of the seat belt, the contact area of the seat belt with the occupant can be ensured largely enough and thereby the crash impact force which will be applied to the occupant via the seat belt during the vehicle crash or the like can be dispersed to the large extent, thereby increasing the crash absorption effect. Particularly, in the case where the bag portion is provided so as to inflate toward the occupant in the thickness direction which will be described later, the distance of between the bags is reduced or eliminated substantially by being pressed by the crash impact force. Thus, the contact area of the seat belt with the occupant can be ensured surely. Also, since the plural bags are disposed in the width direction, the seat belt disposition can be stabilized and thereby the bag portion can be inflated properly.

According to further another preferred embodiment of the present invention, part of the air supply passage is disposed inside the bag portion. Accordingly, since the air supply passage having a certain extent of a forming function is provided in the bag portion of the seat belt, the inflation-air volume can be made further smaller and thereby the bag portion can be inflated in a proper shape within a short period of time.

According to further another preferred embodiment of the present invention, the bag portion is constituted so as to inflate toward the occupant. Accordingly, since the inflatable portion having a proper flexibility is located so as to contact the occupant, the crash absorption effect can be improved further.

Also, the bag portion may be constituted so as to inflate toward both sides in its thickness direction instead of the above-described constitution. According to this constitution, the above-described effect can be obtained surely even if the seat belt is applied to the occupant with its wrong side.

According to further another preferred embodiment of the present invention, the bag portion further comprises a connection portion which interconnects the bags, and the connection portion is constituted so as to be inflated by the supplied air having a specified pressure which is higher than a pressure of the inflation air for inflating the bags. Accordingly, since the bag portion is first inflated in the proper shape within the short period of time and then the connection portion is inflated, a certain extent of crash absorption effect or the like can be obtained surely and the expansion of the connection portion can further improve the crash absorption effect or the like.

In this case, the above-described connection portion may be constituted so as to inflate toward the occupant from its initial deflated state, like the above-described bag portion. Or, this connection portion may be constituted so as to inflate toward both sides in its thickness direction. According to these constitution, the similar effect like the bag portion can be obtained.

According to further another preferred embodiment of the present invention, part of the air supply passage is disposed inside the bag portion, the part of the air supply passage comprises a plurality of air holes to supply the air into the bag portion, and the air holes are provided along a longitudinal direction of the bag portion. Accordingly, since the inflation air is supplied into the bag portion via the plural air holes formed at the part of air supply passage disposed inside the bag portion, the bag portion can be inflated from longitudinal portions and thereby the bag portion can be inflated at the substantially longitudinal area uniformly at a relatively early stage. Thus, the bag portion of the seat belt can be inflated quickly and effectively, thereby providing the proper protection of the occupant.

According to further another preferred embodiment of the present invention, the above-described part of the air supply passage is disposed along the longitudinal direction of the bag portion. Accordingly, since the air supply passage is disposed along the longitudinal direction of the bag portion, namely along the longitudinal direction of the seat belt, the air supply passage provided at the bag portion can be made relatively short and thereby the bag portion can be inflated efficiently having the short air supply passage for supplying the air to the bag portion.

Herein, the air supply passage disposed along the bag portion may be located inside the bag portion. In this case, since no particular space for locating the air supply passage would be necessary, the present invention can be applied to the seat belt without increasing its original width of the seat belt. Further, since the air is supplied to fill only the rest of the volume in the bag portion except the air supply passage, the bag portion can be inflated properly and quickly.

Also, the above-described part of the air supply passage may comprise two passages which are separately disposed at both ends in the bag portion, and the air holes may be provided at the two passages respectively. Accordingly, the bag portion can be inflated from its both ends and thereby the bag portion can be inflated properly and quickly. Also, in the event that the air supply passage is made of materials having the same strength as the seat belt, the air supply passage can function as a reinforcing material.

Although the above-described air supply passage should not be limited to passages including any particular shapes, the air passage which includes a substantially arc cross section, such as circular, oval, long circular, or half circular cross sections, which projects toward the occupant, may be applied. Particularly, it is preferable that the air supply passage includes the substantially circular cross section. Namely, the air supply passage including the arc cross section and projecting toward the occupant can improve a comfortable seat-belt application of the occupant sitting in the seat. Further, the air supply passage including the substantially circular cross section can prevent any risks of injury of the occupant surely which might be caused by the air supply passage, and prevent any unexpected problems of air supplying which might be caused by improper deformation of the air supply passage.

Although the above-described seat belt is constituted so as to be a so-called two-point seat belt or a seat belt for a racing car comprising plural shoulder belts, it may be also a seat belt such as a so-called three-point seat belt which comprises a shoulder belt and a lap belt. Also, it is preferred that the above-described bag portion is provided at the shoulder belt and the lap belt, respectively.

Also, it is preferable that the bag portion provided at the shoulder belt is constituted so as to inflate in such a manner that an expansion rate of its thickness is greater than that of its width. Herein, the expansion rate means a ratio of the thickness or width before the expansion with respect to the thickness or width after the expansion. Accordingly, since the bag portion is so inflated by the inflation air supplied into the bag portion of the shoulder belt that the thickness of the bag portion is increased, the shoulder and chest of the occupant can be restrained effectively by this shoulder belt, thereby protecting the occupant properly.

Meanwhile, it is preferable that the bag portion provided at the lap belt is constituted so as to inflate in such a manner that the expansion rate of its width is greater than that of its thickness. Accordingly, since the bag portion is so inflated by the inflation air supplied into the bag portion of the lap belt that the width of the bag portion is increased, the stomach and waist of the occupant can be restrained effectively by this lap belt, thereby protecting the occupant properly.

Also, according to further another preferred embodiment of the present invention, a vehicle-state detecting device operative to detect a state of the vehicle is provided, the seat belt comprises the shoulder belt and the lap belt, the bag portion is provided respectively at the shoulder belt and lap belt, and the air supply control device is constituted so as to control a characteristic of air supply to the bag portion provided at the shoulder belt and the bag portion provided at the lap belt according to the vehicle state detected by the vehicle-state detecting device. Accordingly, since the characteristic of air supply to the bag portion provided at the shoulder and the bag portion provided at the lap belt, such as the air supply timing and the supply air pressure, is controlled according to the vehicle state detected by the vehicle-state detecting device, the bag portions of the shoulder belt and the lap belt can be inflated respectively at the proper timing and to the proper size and pressed against the occupant. Thus, the pressing force of the bag portions can be dispersed to the large extent and uniformly so as to protect the occupant properly by the seat belt.

According to further another preferred embodiment of the present invention, the above-described vehicle-state detecting device comprises a detecting device operative to detect a high likelihood of an occurrence of vehicle crash, and the above-described air supply control device is constituted so as to control the characteristic of air supply to the bag portion provided at the shoulder belt and the bag portion provided at the lap belt according to the high likelihood of an occurrence of vehicle crash detected by the detecting device. Accordingly, since the air supply timing and the supply air pressure of the air supply to the bag portion provided at the shoulder and the bag portion provided at the lap belt are controlled according to results of the detection by the detecting device, the bag portions of the shoulder belt and the lap belt can be inflated respectively at the proper timing and to the proper size according to the high likelihood of the occurrence of vehicle crash. Thus, the occupant can be protected effectively.

According to further another preferred embodiment of the present invention, the vehicle-state detecting device comprises a sitting-position detecting device operative to detect a sitting position of the occupant on a vehicle seat, and the air supply control device is constituted so as to control the characteristic of air supply to the bag portion provided at the shoulder belt and the bag portion provided at the lap belt according to the sitting position of the occupant detected by the sitting-position detecting device. Accordingly, since the air supply timing and the supply air pressure of the air supply to the bag portion provided at the shoulder and the bag portion provided at the lap belt are controlled according to the sitting position of the occupant on the seat detected by the sitting-position detecting device, the bag portions of the shoulder belt and the lap belt can be properly inflated respectively according to the sitting-position of the occupant. Thus, the occupant can be protected effectively.

According to further another preferred embodiment of the present invention, the above-described vehicle-state detecting device comprises a driving-state detecting device operative to detect a driving state of the vehicle, and the above-described air supply control device is constituted so as to control the characteristic of air supply to the bag portion provided at the shoulder belt and the bag portion provided at the lap belt according to the driving state of the vehicle detected by the driving-state detecting device. Accordingly, since the air supply timing and the supply air pressure of the air supply to the bag portion provided at the shoulder and the bag portion provided at the lap belt are controlled according to the driving state detected by the driving-state detecting device, the bag portions of the shoulder belt and the lap belt can be properly inflated respectively according to the driving state. Thus, the occupant can be protected effectively.

According to further another preferred embodiment of the present invention, the bag portion provided at the shoulder belt is constituted so as to be inflated by the supplied air in such a manner that a thickness thereof increases. Accordingly, since the bag portion is inflated by the air supplied and its thickness increases, the shoulder and chest of the occupant can be restrained effectively by the shoulder belt, thereby protecting the occupant properly.

According to further another preferred embodiment of the present invention, the increased thickness of the bag portion is constituted such that the thickness of the bag portion located at the shoulder of the occupant is greater than that of the other portion of the bag portion provided at the shoulder belt. Accordingly, since the thickness of the bag portion located at the shoulder of the occupant becomes greater than that of the other portion of the bag portion provided at the shoulder belt by the air supplied, the bag portion corresponding to the shoulder of the occupant on which the large restraint force acts from the shoulder belt can be inflated quickly, thereby protecting the occupant properly.

According to further another preferred embodiment of the present invention, the bag portion provided at the lap belt is constituted so as to be inflated by the supplied air in such a manner that the width increases. Accordingly, since the width of the bag portion of the lap belt increases, the stomach and waist of the occupant can be protected properly by the lap belt.

According to further another preferred embodiment of the present invention, the increased width of the bag portion is constituted such that the width of the bag portion located at the stomach of the occupant is greater than that of the other portion of the bag portion provided at the lap belt. Accordingly, since the width of the bag portion provided at the lap portion which is located at the stomach of the occupant becomes greater than that of the other portion, the bag portion corresponding to the stomach of the occupant on which the large restraint force acts from the lap belt can be inflated quickly, thereby protecting the occupant properly.

According to further another preferred embodiment of the present invention, there are provided the detecting device operative to detect the high likelihood of the occurrence of vehicle crash, a vehicle-crash detecting device operative to detect a real occurrence of vehicle crash, a pre-tensioner operative to wind up the seat belt, and an occupant restraint device operative to restrain the occupant, wherein when the high likelihood of the occurrence of vehicle crash is detected by the detecting device, the inflation air is supplied to the bag portion to inflate the bag portion and the seat belt is wound up by the pre-tensioner, and when the real occurrence of vehicle crash is detected, the occupant is restrained by the occupant restraint device.

Accordingly, since the inflation air is supplied to the bag portion to inflate the bag portion and the seat belt is wound up by the pre-tensioner when the high likelihood of the occurrence of vehicle crash is detected, the seat belt is pressed against the occupant to the large extent and thereby the restraint force by the seat belt can be dispersed to the large extent and uniformly, and the occupant can be protected properly by the seat belt. Also, since the occupant restraint device is operated when the real occurrence of vehicle crash is detected and thereby the occupant is restrained by the inflated seat belt, the safety of the occupant can be ensured surely.

According to further another preferred embodiment of the present invention, when the high likelihood of the occurrence of vehicle crash is detected by the detecting device, at first the inflation air is supplied to the bag portion to inflate the bag portion and then the seat belt is wound up by the pre-tensioner. Accordingly, since the seat belt is wound up by the pre-tensioner after the bag portion is inflated by the inflation air supplied when the high likelihood of the vehicle crash occurrence is detected, the occupant can be prevented effectively from being pressed with a too-large force due to the seat belt which would be wound up improperly early.

According to further another preferred embodiment of the present invention, the amount of the seat belt wound up by the pre-tensioner is adjusted according to the amount of the air supplied to the bag portion. Accordingly, since the amount of the seat belt, which is wound up by the pre-tensioner when the high likelihood of the occurrence of vehicle crash is detected, is adjusted according to the amount of the air supplied to the bag portion, the occupant can be prevented effectively from being pressed with an inappropriately large force and an insufficient force, thereby protecting the occupant safely.

According to further another preferred embodiment of the present invention, the amount of an operation to restrain the occupant by the occupant restraint device is adjusted according to the amount of the air supplied to the bag portion and the amount of the seat belt wound up by the pre-tensioner. Accordingly, since the amount of the operation to restrain the occupant by the occupant restraint device is adjusted according to the amount of the air supplied to the bag portion and the amount of the seat belt wound up by the pre-tensioner, the restraint force by the restraint device can be adjusted properly and thereby the occupant can be prevented from being pressed with the inappropriately large force, thereby ensuring the safety of the occupant effectively.

According to further another preferred embodiment of the present invention, there is further provided a failsafe detecting device operative to detect a malfunction of the air supply, wherein when the malfunction of the air supply is detected by the failsafe detecting device, an operation of the belt winding by the pre-tensioner is changed to a manner which is different from that in a normal state. Accordingly, since the belt winding by the pre-tensioner during the malfunction of the air supply is operated differently from the normal state, any problems that, for example, the amount of the belt winding by the pre-tensioner would be set to a too-small amount regardless of an insufficient amount of inflation air supplied to the bag portion, can be prevented properly.

According to further another preferred embodiment of the present invention, when there occurs no real vehicle crash within a specified period of time after the inflation air is supplied to the bag portion, the supplied air is discharged from the bag portion so as to return the bag portion to the deflated initial state. Accordingly, since the supplied air is discharged from the bag portion so as to return the bag portion to the deflated initial portion when the avoidance of the vehicle crash is confirmed by detecting no occurrence of the real vehicle crash within the specified (predetermined and predeterminable) period of time after the inflation air is supplied to the bag portion according to the detection of the high likelihood of the occurrence of vehicle crash, the seat belt can be returned to the normal use state.

Other features, aspects, and advantages of the present invention will become apparent from the following description which refers to the accompanying drawings.

BRIEF DESCRIPTION OF THE DRAWINGS

FIG. 14 is a chart showing an exemplified control map for an air supply.

FIG. 32 is a chart showing further another exemplified control map for the air supply.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Figure 1:
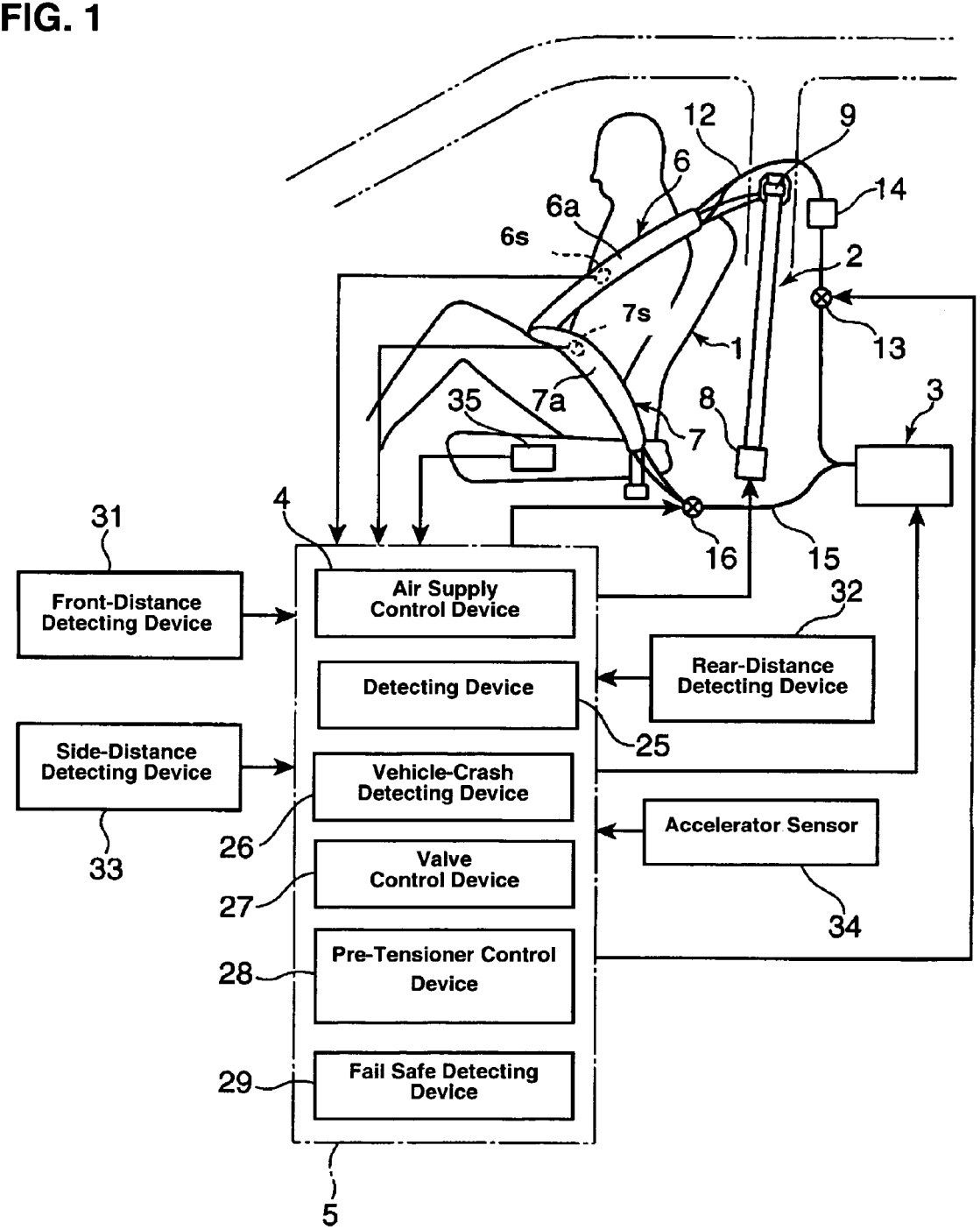
FIG. 1 is an explanatory diagram of an embodiment of a seat belt device for a vehicle according to the present invention.
Figure 2:
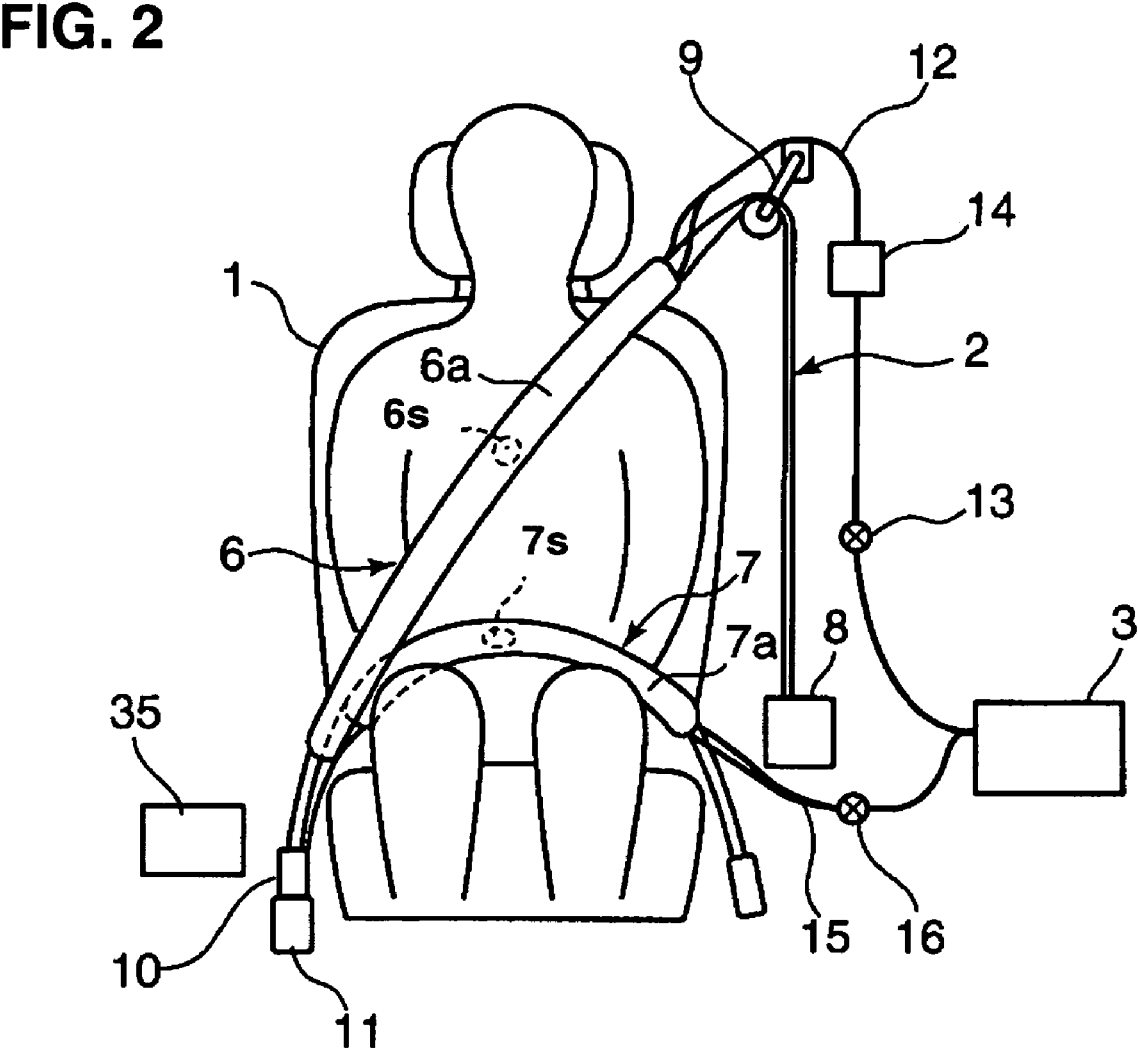
FIG. 2 is an elevation view illustrating a specific structure of a seat belt mechanism.

FIGS. 1 and 2 illustrate an embodiment of the seat belt device for a vehicle according to the present invention. The present seat belt device for a vehicle comprises a seat belt mechanism 2 which can protect an occupant (passenger) sitting on a seat 1, a blower device 3 which can repeatedly supply inflation air to bag portions 6a and 7a provided at the seat belt, and a control unit 5 which includes an air supply control device 4 to control an operational state of the blower device 3.

The seat belt mechanism 2 is comprised of a three-point seat belt mechanism which comprises a seat belt including a shoulder belt 6 to restrain the occupant's shoulder and chest and a lap belt 7 to restrain the occupant's stomach and waist, a retractor 8 which is provided for the shoulder belt 6 at the rear and lower portion of the seat 1, an anchor 9 which supports the shoulder belt 6 at the rear and upper end of the seat 1, a tongue 10 which is provided at respective ends of the shoulder belt 6 and the lap belt 7, and a buckle 11 which is fixed to a vehicle body and engages with the tongue 10 at the side of the seat 1.

Figure 3A:
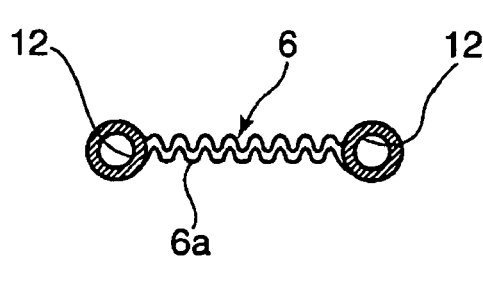
FIGS. 3A and 3B are explanatory diagrams illustrating a specific structure of a shoulder belt.

The shoulder belt 6 includes a bag portion 6a which is provided so as to extend from its front end where the tongue 10 is provided to a support portion by the anchor 9, and a pressure sensor 6s is provided in the bag portion 6a to sense the pressure therein. The bag portion 6a is made of a bag material which inflates from its deflated state illustrated in FIG. 3A to its inflated state illustrated in FIG. 3B, and a pair of air supply passages 12 which is made of a tube is provided inside the bag portion 6a.

The air supply passage 12 is coupled to the blower device 3 and includes a valve 13 operative to open and close the passage. Near the disposition portion of the anchor 9 is provided a retractor 14 operative to draw or wind up the air supply passage 12 according to the draw or the winding of the shoulder belt 6 from or by the retractor 8.

Figure 3B:
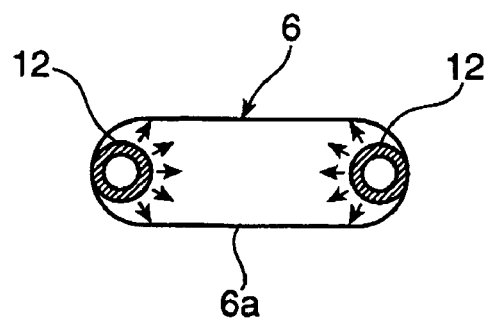

The bag portion 6a is inflated by opening the valve 13 and operating the blower device 3 to supply pressured air therein via through holes formed around the periphery of the air supply passage 12. The bag portion 6a is inflated in such a manner that its width increases as illustrated in FIG. 3B. The inflation state of the bag portion 6a is maintained by closing the valve 13. The blower device 3 and the air supply passage 12 also function as an air discharge device to discharge the inflation air supplied in the bag portion 6a. Namely, the inflated bag portion 6a is returned to its deflated state illustrated in FIG. 3A by opening the vale 13 and operating the blower device 3 reversely to discharge the air from the bag portion 6a.

Figure 4A:
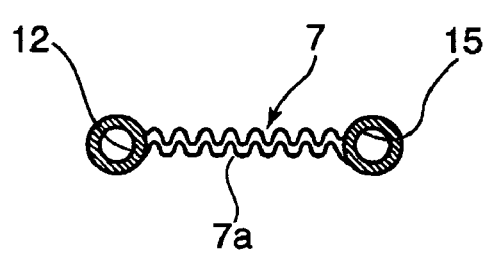
FIGS. 4A and 4B are explanatory diagrams illustrating a specific structure of a lap belt.
Figure 4B:
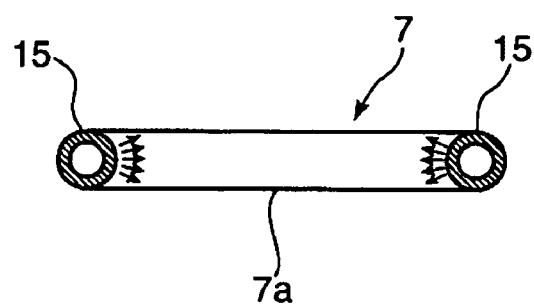

The above-described lap belt 7 includes a bag portion 7a which is made of a bag material which inflates from the deflated state illustrated in FIG. 4A to the inflated state illustrated in FIG. 4B. The bag portion 7a is disposed so as to contact the occupant's stomach and waist, and an air supply passage 15 which is made of a pair of tubes and a pressure sensor 7s are provided in the bag portion 7a. The air supply passage 15 is coupled to the blower device 3 and includes a valve 16 to open and close the passage, like the air supply passage 12 for the above-described shoulder belt 6.

The bag portion 7a is inflated by opening the valve 16 and operating the blower device 3 to supply pressured air therein via through holes formed around the periphery of the air supply passage 15. The bag portion 7a is inflated in such a manner that its width increases as illustrated in FIG. 4B. The inflation state of the bag portion 7a is maintained by closing the valve 16. The blower device 3 and the air supply passage 15 also function as an air discharge device to discharge the inflation air supplied in the bag portion 7a. Namely, the inflated bag portion 7a is returned to its deflated state illustrated in FIG. 4A by opening the vale 16 and operating the blower device 3 reversely to discharge the air from the bag portion 7a.

Figure 5:
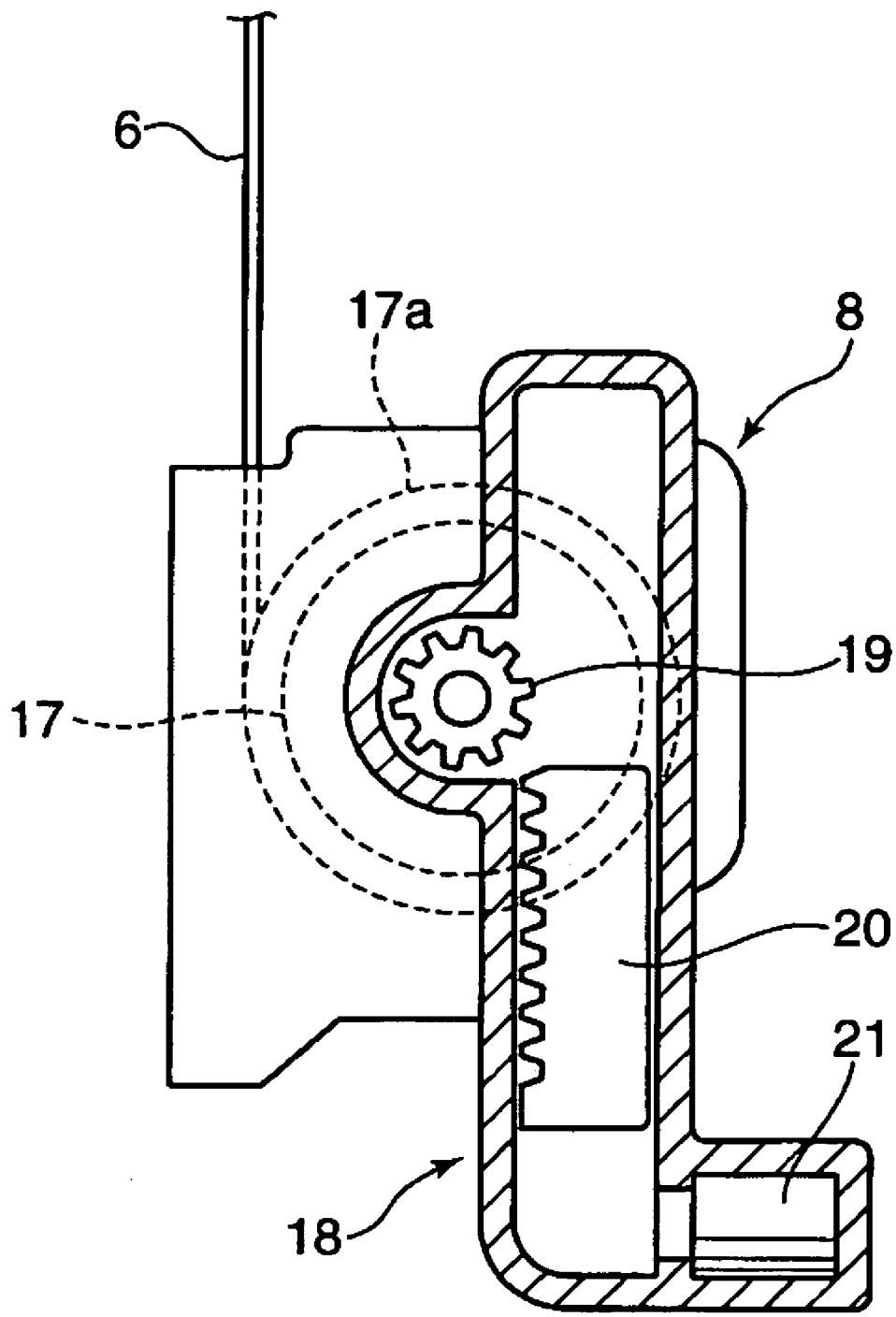
FIG. 5 is a sectional view illustrating a specific structure of an inflator.

At the retractor 8 are provided a first pre-tensioner 17, a load limiter, and a second pre-tensioner 18 as an occupant restraint device, as illustrated in FIG. 5. The first pre-tensioner 17 supports the shoulder belt 6 so as to allow the belt to be drawn and is comprised of an electric motor to drive a reel 17a for the shoulder belt 6. The load limiter, which is not illustrated, limits the abrupt draw of the shoulder belt 6. The second pre-tensioner 18 functions as the occupant restraint device which provides a specified tension with the shoulder belt 6 by winding up the belt to a certain extent when the vehicle crash occurs.

The above-described second pre-tensioner 18 comprises a pinion gear 19 which is coupled to a drive shaft of the reel 17a, a rack gear 20 which drives the pinion gear 19, and an inflator 21 which operates the rack gear 20. Herein, when the vehicle crash occurs, the inflator 21 is operated to generate gas and the rack gear 20 is moved from its lower original position to its upper driving position by the gas pressure. Thereby, the pinion gear 19 is rotated and the shoulder belt 6 is wound up promptly.

Figure 6:
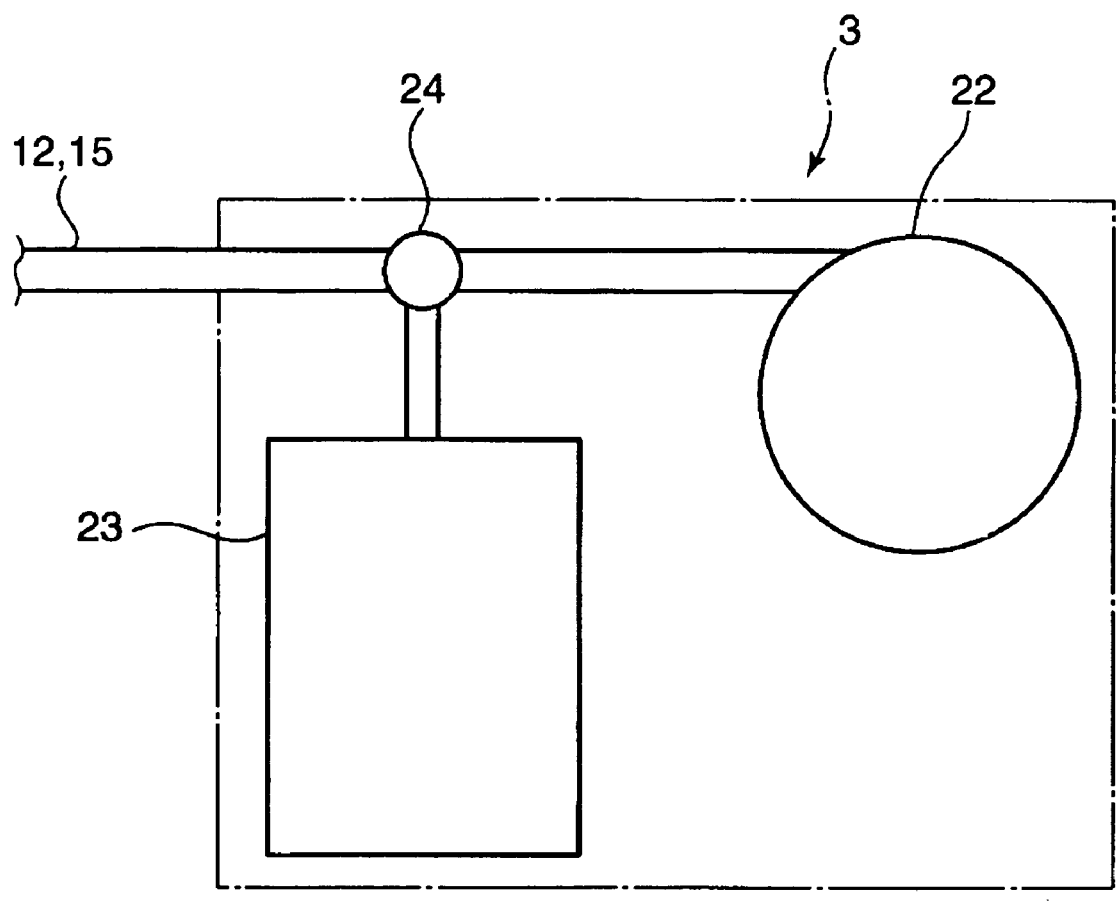
FIG. 6 is an explanatory diagram illustrating a specific structure of a blower device.

The above-described blower device 3 comprises, as illustrated in FIG. 6, a blower resource 22 which is constituted of an electric motor or the like operative to pressure air and provide the pressured air, an accumulator 23 which accumulates the pressured inflation air from the blower resource 22, and a switching valve 24 which switches an air supply direction to the air supply passages 12 and 15 from the blower resource 22 and the accumulator 23. The switching valve 24 is also operative to connect the blower resource 22 with the accumulator 23, disconnecting the passages 12 and 15 from them, at need.

Herein, when the switching valve 24 is operated according to the control signal from the air supply control device 4 of the control unit 5 so as to connect the accumulator 23 with the air supply passages 12 and 15, the pressured air in the accumulator 23 is supplied to bag portion 6a of the shoulder belt 6 and the bag portion 7a of the lap belt 7 via the air supply passages 12 and 15, respectively. Also, in a state where the blower resource 22 is connected with the air supply passages 12 and 15 by the switching valve 24, by operating the blower resource 22, the air is supplied from the blower resource 22 to the bag portion 6a of the shoulder belt 6 and the bag portion 7a of the lap belt 7 via the air supply passages 12 and 15, respectively, and by changing the rotational speed of the blower resource 22, the pressure of the supplied air is adjusted.

The control unit 5 further comprises, as illustrated in FIG. 1, a detecting device 25 which detects a high likelihood of an occurrence of the vehicle crash, a vehicle-crash detecting device 26 which detects a real occurrence of the vehicle crash, a valve control device 27 which generates a control signal of the valves 13 and 16, a pre-tensioner control device 28 which generates an operational signal of the above-described first and second pre-tensioners 17 and 18, and a failsafe detecting device 29 which detects a malfunction of the air supply from the blower device 3.

The detecting device 25 detects the high likelihood of the occurrence of the vehicle crash based on detecting signals of a front-distance detecting device 31, a rear-distance detecting device 32 or a side-distance detecting device 33, which are constituted of sensing devices provided at the front, the rear and the both sides of the vehicle, such as a supersonic sensor, an infrared sensor or a radar to detect a relative distance or relative speed with another vehicle located at the front, the rear or the sides of the vehicle. When the detecting device 25 detects the high likelihood of the vehicle crash occurrence, it generates the detecting signal of the high likelihood of vehicle crash and supplies it to the above-described air supply control device 4 and the valve control device 27. Also, the detecting device 25 detects a crash impact force based on the above-described signals and generates a detecting signal of the crash impact force and supplies it to the air supply control device 4.

The vehicle-crash detecting device 26 determines that the vehicle crash occurs when an action of a large impact load is detected based on a detecting signal from an acceleration sensor 34 which is provided at the front portion of the vehicle, and generates a crash detecting signal and supplies it to the valve control device 27 and the pre-tensioner control device 28.

The valve control device 27 generates an opening signal and supplies this signal to the valves 13 and 16 to open these valves when the detecting signal of the high likelihood of vehicle crash is received from the detecting device 25. The valve control device 27 also determines whether a predetermined supply period of time has passed or not after the air supply from the air supply control device 4 to the bag portions 6a and 7a of the seat belt had started. And, the valve control device 27 generates a closing signal and supplies this signal to the valves 13 and 16 to close these valves when the supply period of time has passed. Herein, the supply period of time is set at a proper period of time based on the pressure of the supply air supplied from the blower device 3 which can properly inflate the bag portions 6a and 7a by supplying the inflation air to the bag portions 6a and 7a of the seat belt.

Also, the air supply control device 4 generates a switching signal and supplies this signal to the switching valve 24 to connect the accumulator 23 of the blower device 3 with the air supply passages 12 and 15 when the detecting signal of the high likelihood of vehicle crash is received from the detecting device 25, thereby supplying the pressured air from the accumulator 23 to the bag portions 6a of the shoulder belt 6 and 7a of the lap belt 7 via the air supply passages 12 and 15. And, when the predetermined supply period of time has passed after the pressured air supply had started, the air supply control device 4 generates a switching signal to connect the blower resource 22 of the blower device 3 with the air supply passages 12 and 15 and supplies this signal to the switching valve 24, and generates an operation signal to operate the blower resource 22. And, the air supply control device 4 adjusts the rotational speed of the blower resource 22 according to the crash impact force detected by the detecting device 25.

Herein, the air pressure in the accumulator 23 is maintained above a specified pressure by operating the blower resource 22 and supplying the pressured air to the accumulator 23 with the switching valve 24 being switched so as to connect the blower resource 22 of the blower device 3 with the accumulator 23 when the air pressure in the accumulator 23 becomes below the specified pressure or periodically.

Also, there is provided a setting switch 35 to supply the inflation air to inflate the bag portions 6a and 7a of the seat belt at the side portion of the seat 1. When the setting switch 35 is operated, the blower resource 22 of the blower device 3 is operated in a state where the blower resource 22 is connected with the air supply passages 12 and 15, and thereby a certain amount of pressured air is supplied to the bag portions 6a and 7a of the seat belt to inflate the bag portions.

The above-described pre-tensioner control device 28 generates a control signal to operate the first pre-tensioner 17 and winds up the shoulder belt 6 after the above-described inflation control of the bag portions 6a and 7a has been conducted when the high likelihood of vehicle crash had been detected. Also, the pre-tensioner control device 28 adjusts the amount of winding of the shoulder belt 6 by the first pre-tensioner 17 according to the amount of air supplied to the bag portions 6a and 7a of the seat belt from the blower device 3, which will be described below in detail.

The pre-tensioner control device 28 also generates an operational signal to operate the inflator 21 of the second pre-tensioner 18 and makes the inflator 21 generate operational gas when the vehicle crash is detected by the vehicle-crash detecting device 26, thereby winding up the shoulder belt promptly and restraining the occupant with a proper restraint force.

The above-described failsafe detecting device 29 detects the malfunction of the air supply from the blower device 3 to the bag portions 6a and 7a by determining whether or not the pressure of the air in the bag portions 6a and 7a which has supplied from the blower device 3 via the air supply passages 12 and 15 increases to an appropriate pressure. In the event that the malfunction of the air supply is detected, a failsafe signal is generated and supplied to the above-described air supply control device 4 and the pre-tensioner control device 28. When the failsafe signal is generated from the failsafe detecting device 29, a control to discharge the air from the bag portions 6a and 7a is conducted by the air supply control device 4, and a control to change the winding sate of the shoulder belt 6 by the first pre-tensioner 17 from its normal state is conducted by the pre-tensioner control device 28.

Figure 7:
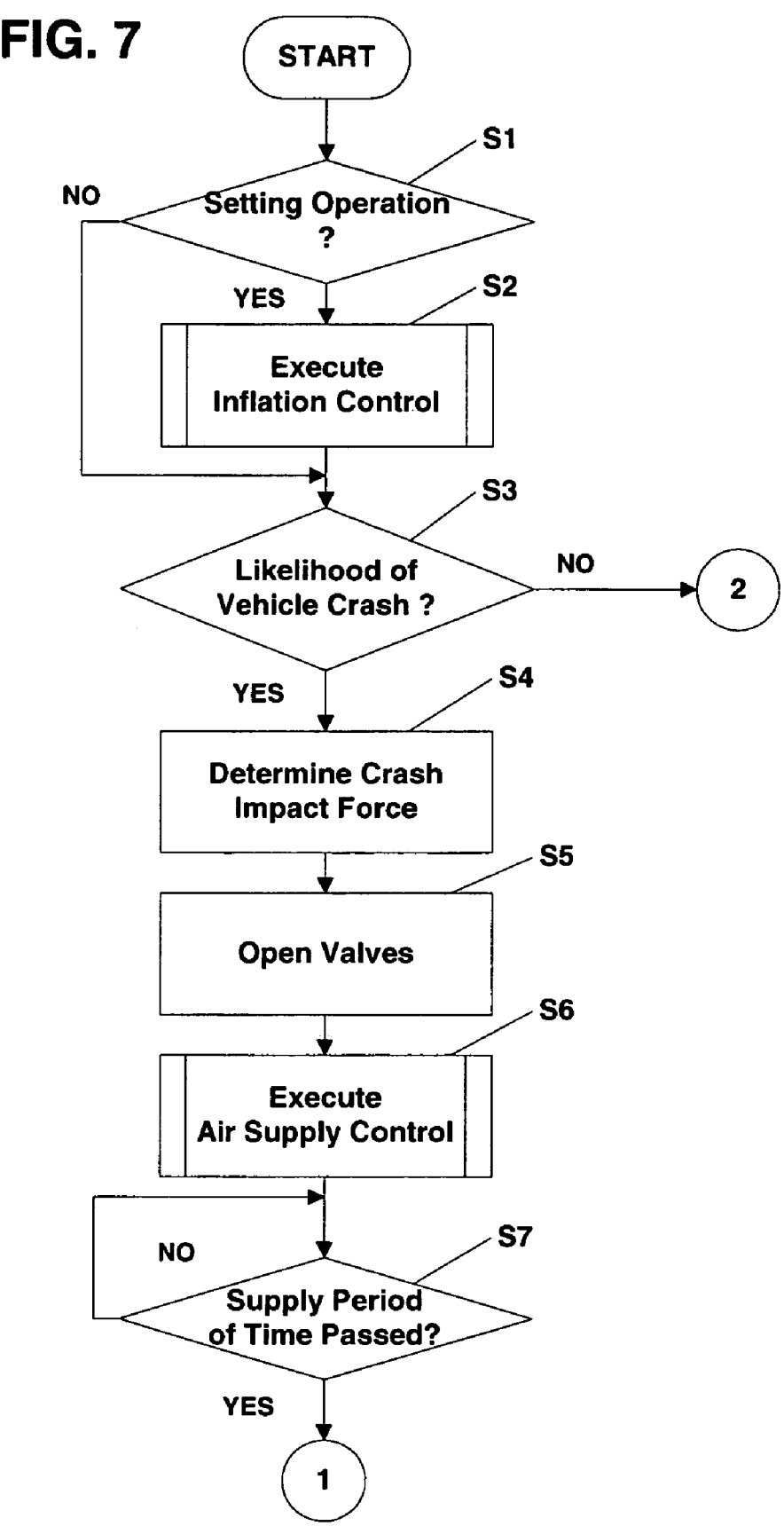
FIG. 7 is a flowchart of a first half of a control operation of the seat belt device for a vehicle according to a control unit.
Figure 8:
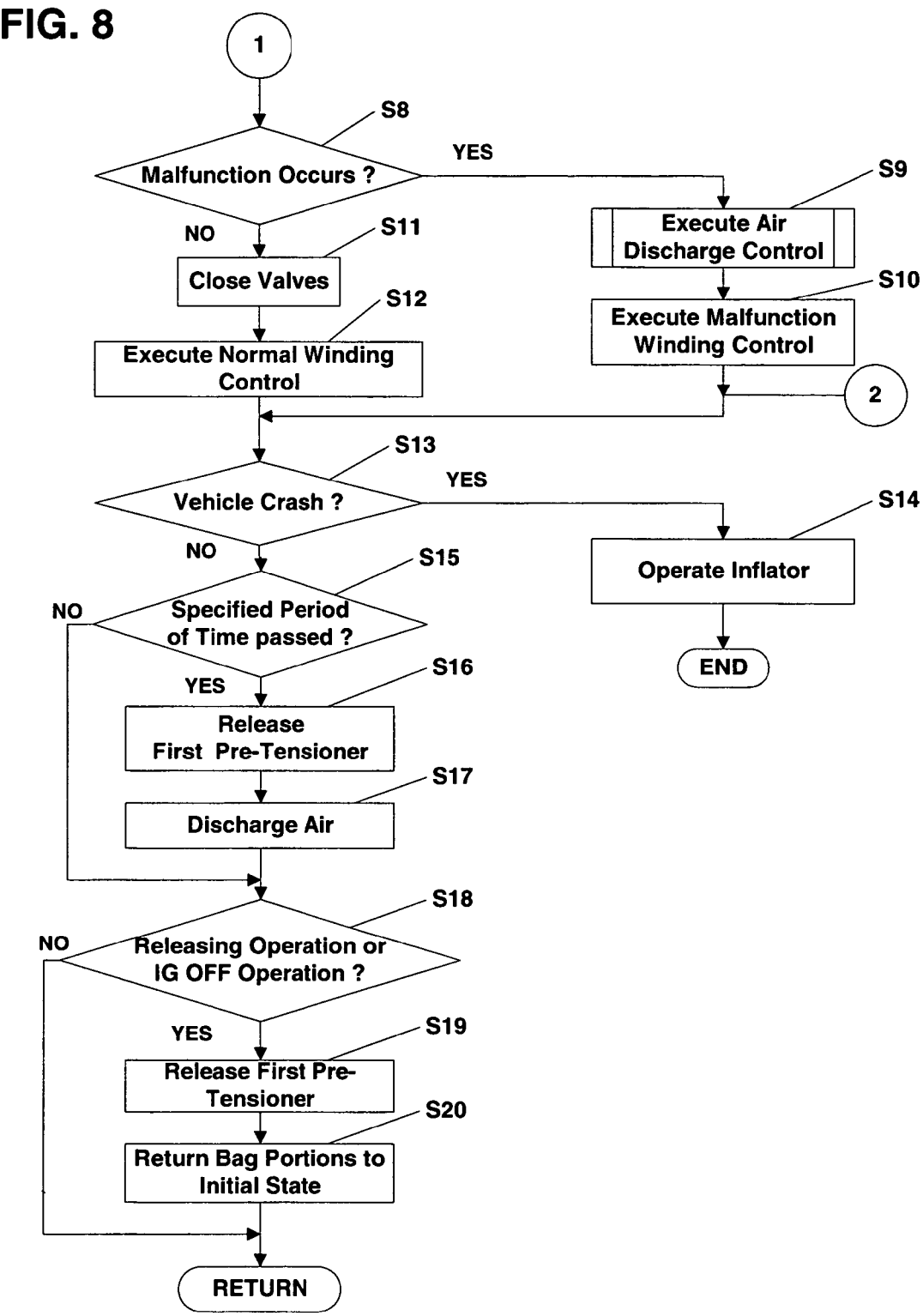
FIG. 8 is a flowchart of a second half of the control operation of the seat belt device for a vehicle according to the control unit.

The control operation executed by the control unit 5 of the seat belt device for a vehicle described above will be described referring to flowcharts of FIGS. 7 and 8. When the control operation starts, first it is determined whether or not the setting operation to inflate the bag portions 6a and 7a is made by the setting switch 35 (Step S1). When the answer is YES, the inflation control of the bag portions 6a and 7a is executed by the setting operation of the occupant by operating the blower resource 22 and supplying the air to the bag portions 6a and 7a of the seat belt in the sate where the blower resource 22 of the blower device 3 is connected with the air supply passages 12 and 15 (Step S2). Next, it is determined whether or not the high likelihood of the vehicle crash is detected by the detecting device 25 (Step S3). When the answer is NO, the control sequence proceeds to step S13 described below.

Meanwhile, when the high likelihood of the vehicle crash is detected and the answer to step S3 is YES, the crash impact force is determined based on the relative distance and relative speed with another vehicle located and the like (Step S4). And, the control signal to open the valves 13 and 16 is generated by the valve control device 27 (Step S5), and the control signal to operate the blower device 3 and supply the air to the bag portions 6a and 7a of the seat belt is executed by the air supply control device 4 (Step S6).

Specifically, when the detecting signal of the high likelihood of vehicle crash is received from the detecting device 25, the switching valve 24 is controlled so as to connect the accumulator 23 of the blower device 3 with the air supply passages 12 and 15 and the pressured air is supplied to the bag portions 6a and 7a of the seat belt from the accumulator 23 via the air supply passages 12 and 15. And, when the predetermined supply period of time has passed thereafter, the switching valve 24 is controlled so as to connect the blower resource 22 of the blower device 3 with the air supply passages 12 and 15 and the rotational speed of the blower resource 22 is adjusted according to the crash impact force detected by the detecting device 25. Thus, the air supply control to the bag portions 6a and 7a of the seat. belt is executed by the air supply control device 4.

Next, it is determined by the air supply control device 4 whether the condition for the air-supply stopping is satisfied or not by determining whether or not the predetermined supply period of time has passed after the air supply to the bag portions 6a and 7a had started (Step S7). When the passage of the predetermined period of time after the start of the air supply is determined and the answer to step S7 is YES, it is determined based on the detecting signals of the pressure sensors 6s and 7s whether the malfunction of the air supply occurs or not (Step S8).

When it is determined that the air pressure in the bag portions 6a and 7a does not increase to the proper pressure regardless of the passage of the predetermined period of time due to the air supply malfunction and the answer to step S8 is YES, the valves 13 and 16 are opened and thereby the control of discharging the air from the bag portions 6a and 7a of the seat belt is executed (Step S9), and the first pre-tensioner 17 is operated in the different manner from its normal state and thereby the winding control of the shoulder belt 6 for the malfunction is executed (Step S10).

Namely, when the malfunction of the air supply by the blower device 3 is determined in step S8, the air in the bag portions 6a and 7a of the seat belt is discharged by operating the blower resource 22 reversely with the switching valve 24 connecting the blower resource 22 of the blower device 3 with the air supply passages 12 and 15 in step S9, and thereby the control of returning the bag portions 6a and 7a to their initial state is executed by the air supply control device 4. Next, the winding control for the malfunction is executed in step S10 by setting the winding speed of the shoulder belt 6 by the first pre-tensioner 17 at a speed slower than that in the normal state or setting the winding amount of the shoulder belt 6 at an amount greater than that in the normal state. Then, the control sequence proceeds to step S13 which will be described below.

Also, when the normal state of the air supply to the bag portions 6a and 7a of the seat belt by the blower device 3 is determined and the answer to step S8 is NO, the valves 13 and 16 are closed by the closing signal (Step S11), and the normal control to adjust the winding amount of the shoulder belt 6 by the first pre-tensioner 17 according to the amount of the air supplied to the bag portions 6a and 7a is executed (Step S12). Namely, the air amount supplied to the bag portions 6a and 7a is detected based on the pressure and the supply period of time of the air supplied to the bag portions 6a and 7a of the seat belt from the blower device 3 via the air supply passages 12 and 15, and the normal winding control in which the winding amount of the shoulder belt 6 when the air amount is greater is set so as to be smaller than that when the air amount is smaller is executed.

Next, it is determined whether or not the vehicle crash is detected by the vehicle-crash detecting device 26 (Step S13). When the answer is YES, the operational signal is supplied to the inflator 21 of the second pre-tensioner 18, thereby executing the winding control of the shoulder 21 (Step S14). Then, the control sequence ends.

Meanwhile, when the answer to step S13 is NO, it is determined whether or not the predetermined specified period of time has passed after the high likelihood of vehicle crash had been detected by the detecting device 25 (Step S15). This specified period of time is set at a proper period of time which can determine whether the vehicle crash is avoided or not after the detection of the high likelihood of vehicle crash. When the answer to step S15 is YES, the winding state of the shoulder belt 6 by the first pre-tensioner 17 is released and the tension of the belt is returned to its initial state (Step S16). Then, the valves 13 and 16 are opened and the air is discharged from the bag portions 6a and 7a of the seat belt, and thereby the control to return the bag portions 6a and 7a to the initial state is executed (Step S17). Namely, the control to adjust the air pressure in the bag portions 6a and 7a to the setting pressure set by the setting switch 35 is executed by the air supply control device 4 by operating the blower resource 22 reversely and discharging the air from the bag portions 6a and 7a with the switching valve 24 connecting the blower resource 22 of the blower device 3 with the air supply passages 12 and 15.

Next, it is determined whether or not the releasing operation of the seat belt or the OFF operation of the ignition key switch (IG) is done (Step S18). When the answer is YES, the winding state of the shoulder belt 6 by the first pre-tensioner 17 is released and thereby the tension of the seat belt is returned to the initial state (Step S19). And, the valves 13 and 16 are opened and the air is discharged from the bag portions 6a and 7a of the seat belt, and thereby the control to return the bag portions 6a and 7a to the initial state is executed (Step S20). Then, the control sequence returns.

The control to return the bag portions 6a and 7a of the seat belt to the deflated initial state is executed by the air supply control device 4 by operating the blower resource 22 reversely and discharging all the air from the bag portions 6a and 7a with the switching valve 24 connecting the blower resource 22 of the blower device 3 with the air supply passages 12 and 15, for example, when the releasing operation of the seat belt is detected based on a detecting signal of a buckle switch to detect that the tongue 10 of the seat belt mechanism 2 is removed from the buckle 11 or when the OFF operation of the ignition key switch is detected based on a signal of the ignition key switch.

As described above, there is provided the seat belt device for a vehicle, comprising the inflatable bag portions 6a and 7a provided at the shoulder belt 6 and the lap belt 7 for protecting the occupant and adapted to receive inflation air, the blower device 3 operative to repeatedly supply the inflation air to the bag portions 6a and 7a, the air supply passages 12 and 15 connecting the bag portions 6a and 7a with the blower device 3, the detecting device 25 operative to detect the high likelihood of the occurrence of vehicle crash, and the air supply control device 4 operative to supply the inflation air from the blower device 3 to the bag portions 6a and 7a so as to inflate the bag portions and discharge the supplied air from the bag portions so as to return the bag portions to the deflated initial state, wherein the inflation air is supplied to the bag portions to inflate the bag portions when the high likelihood of the occurrence of vehicle crash is detected by the detecting device 25. Thus, the inflation operation of the inflatable bag portions 6a and 7a can be reused to protect the occupant properly.

Namely, since when the high likelihood of vehicle crash is detected, the blower device 3 is operated and the inflation air is supplied to the bag portions 6a and 7a of the seat belt and thereby the bag portions are inflated, the occupant can be restrained by the seat belt comprising the shoulder belt 6 and the lap belt 7 to the properly large extent, thereby with the properly dispersed restraint force. Also, since when it is detected that the vehicle crash has been avoided after the detection of the high likelihood of vehicle crash, the air is discharged from the bag portions 6a and 7a so that the bag portions can be retuned to the initial deflated state, the bag portions 6a and 7a can be inflated again by operating the blower device 3 when the high likelihood of vehicle crash is detected later.

Also, in the above-described embodiment, there are further provided the valves 13 and 16 which are provided at the air supply passages 12 and 15, and the valve control device 27 operative to control the valves 13 and 16 so as to open and shut the air supply passages according to the specified control condition. Accordingly, since the valves 13 and 16 shut the air supply passages at the specified close timing after the inflation air has been supplied to the bag portions 6a and 7a according to the operation of the blower device 3, the inflation state of the bag portions 6a and 7a can be maintained stably. Also, since the valves 13 and 16 open at the specified open timing, the air provided in the bag portions 6a and 7a can be discharged and thereby the bag portions 6a and 7a can be returned to the deflated initial state preparing for the next inflation operation.

Further, in the above-described embodiment, since the valves 13 and 16 shut the air supply passages when the specified supply period of time has passed after the inflation air supply to the bag portions 6a and 7a had started, the stable inflation state of the bag portions 6a and 7a of the seat belt can be maintained, preventing a leakage of the air from the bag portions effectively.

Herein, as illustrated in FIG. 2, there may be provided the presser sensors 6s and 7s to detect the air pressure in the bag portions 6a and 7a of the seat belt, wherein the valves 13 and 16 are controlled so as to shut the air supply passages when the pressure sensed by the pressure sensors 6s and 7s have reached the specified pressure after the supply of the inflation air to the bag portions had started. Accordingly, since the valves 13 and 16 shut the air supply passages when the pressure in the bag portions 6a and 7a have reached the specified pressure after the inflation air supply to the bag portions had started and thus the proper inflation state established has been confirmed, the stable inflation state of the bag portions 6a and 7a of the seat belt can be maintained.

Also, the valves 13 and 16 are controlled so as to shut the air supply passages when the real occurrence of vehicle crash has been detected by the vehicle-crash detecting device 26 after the supply of the inflation air to the bag portions 6a and 7a had started. Accordingly, since the valves 13 and 16 shut the air supply passage when the real occurrence of vehicle crash has been detected, the air in the bag portions 6a and 7a can be prevented from leaking during the occurrence of the vehicle crash. Thereby, the stable inflation state of the bag portions 6a and 7a of the seat belt can be maintained and the occupant can be protected effectively during the vehicle crash.

Herein, the valves 13 and 16 may be controlled so as to shut the air supply passages when the specified period time has passed, the air pressure in the bag portions 6a and 7a detected by the pressure sensors 6s and 7s has reached the specified pressure, or the real vehicle crash has occurred after the supply of the inflation air to the bag portions 6a and 7a had started, thereby preventing the air leakage from the bag portions 6a and 7a of the seat belt.

Also, in the case, as the embodiment described above, where the supply pressure of the air is adjusted based on the crash impact force of the vehicle after the pressured inflation air has been supplied to the bag portions 6a and 7a with the operation of the blower device 3, Wrinkles can be smoothed out from the bag portions properly by the pressured air supplied to the bag apportions 6a and 7a first, and then the supply pressure of the air can be adjusted at the proper pressure in the state where the passage for the air flow to the bag portions has been established. Accordingly, the bag portions 6a and 7a of the seat belt can be inflated properly.

Figure 9:
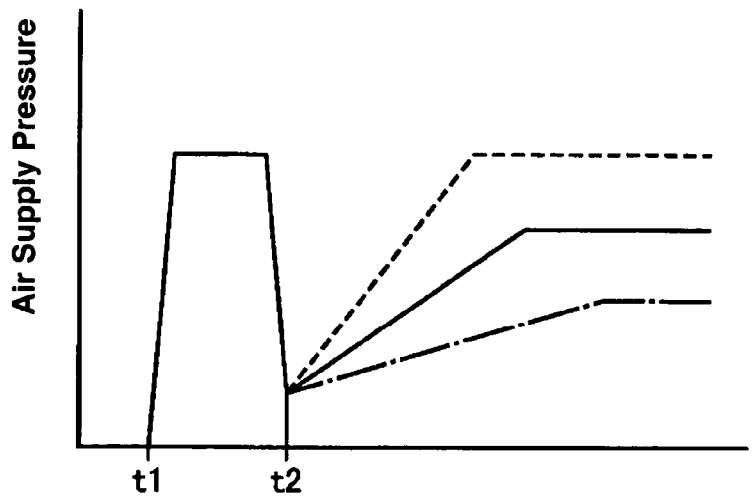
FIG. 9 is a time chart showing a changing state of an air supply pressure.

Particularly, in the embodiment described above, the blower device 3 comprises the blower resource 22, which is comprised of the electric motor or the like, operative to pressure air and provide the inflation air, and the accumulator 23 operative to accumulate the pressured inflation air, and the pressured inflation air in the accumulator 23 is supplied to the bag portions 6a and 7a of the seat belt when the high likelihood of the occurrence of vehicle crash is detected. Accordingly, the pressured air can be promptly supplied to the bag portions 6a and 7a of the seat belt from the accumulator 23 at the timing t1, as illustrated in FIG. 9, when the high likelihood of the occurrence of vehicle crash is detected, by connecting the accumulator 23 with the air supply passages 12 and 15. Thus, the flow passage of the air supplied to the bag portions 6a and 7a can be established quickly. And, by increasing the rotational speed of the blower resource 22 at the timing t2 when the air flow passage to the bag portions 6a and 7a has been established by the pressured air from the accumulator 23, the inflation air can be supplied to the bag portions 6a and 7a from the blower resource 22 and thereby the proper inflation of the bag portions 6a and 7a of the seat belt can be attained.

Also, in the case, as the embodiment described above, where the pressure of the inflation air supplied to the bag portions 6a and 7a is adjusted according to the vehicle state, such as the crash impact force which is determined according to the relative speed and the relative distance with the other vehicle, the inflation of the bag portions can be attained properly according to the crash impact force or the like during the vehicle crash and thereby the occupant can be protected effectively.

Namely, in the event that the large crash impact force is determined, the rotational speed of the blower resource 22 is set at a relatively high speed, compared with the event that the small crash impact force is determined. Thus, the larger amount of inflation air is supplied to the bag portions 6a and 7a within the air supply period of time by increasing the supply pressure of air. Accordingly, the bag portions 6a and 7a can be inflated to the larger extent and thereby the restraint force of the occupant can be increased. Also, the restraint force can be dispersed to the larger extent over the seat belt, and thereby the occupant can be protected effectively from the crash impact of the vehicle.

Also, according to the embodiment described above, when there occurs no real vehicle crash within the specified period of time after the inflation air is supplied to the bag portions 6a and 7a, the supplied air is discharged from the bag portions 6a and 7a so as to return the bag portions to the deflated initial state. Accordingly, since the bag portions 6a and 7a can be returned to the deflated initial state by discharging the air when the avoidance of the vehicle crash is confirmed or the like after the inflation air is supplied to the bag portions, the seat belt can be returned to the normal use state.

Also, according to the embodiment described above, when the seat belt applied to the occupant is removed or the ignition key switch of the vehicle is turned off, the supplied air is discharged from the bag portions 6a and 7a so as to return the bag portions 6a and 7a to the deflated initial state. Accordingly, since the bag portions 6a and 7a are returned to the deflated initial state when the restraint of the occupant by the seat belt has become unnecessary or the like, the occupant can apply the seat belt easily when the occupant wants to reuse the seat belt.

Herein, in the embodiment described above, the blower device 3 and the air supply passages 12 and 15 function as the air discharge device to discharge the inflation air supplied in the bag portions 6a and 7a in such a manner that the inflated bag portions 6a and 7a are returned to the deflated state by opening the vales 13 and 16 and operate the blower device 3 reversely. However, there may be provided an additional exhaust passage and an additional valve to open and close this additional exhaust passage, which constitute the air discharge device to discharge the inflation air supplied in the bag portions 6a and 7a, instead of the above-described embodiment.

Also, according to the embodiment described above, there are provided the detecting device 25 operative to detect the high likelihood of the occurrence of vehicle crash, the vehicle-crash detecting device 26 operative to detect the real occurrence of vehicle crash, the first pre-tensioner 17 operative to wind up the seat belt, and the occupant restraint device comprised of the second pre-tenstioner 18 operative to restrain the occupant, wherein when the high likelihood of the occurrence of vehicle crash is detected by the detecting device 25, the inflation air is supplied to the bag portions 6a and 7a from the blower device 3 via the air supply passages 12 and 15 to inflate the bag portions and the seat belt is wound up by the first pre-tensioner 17, and when the real occurrence of vehicle crash is detected, the occupant is restrained by the occupant restraint device.

Accordingly, since the inflation air is supplied to the bag portions 6a and 7a to inflate the bag portions by operating the blower device 3 and the seat belt is wound up by the first pre-tensioner 17 when the high likelihood of the occurrence of vehicle crash is detected, the seat belt is pressed against the occupant to the large extent and thereby the restraint force by the seat belt can be dispersed to the large extent and uniformly, and the occupant can be protected properly in the seat 1 by the seat belt.

Also, since the occupant restraint device comprised of the second pre-tensioner 18 including the inflator 21 is operated so as to wind up the seat belt and restrain the occupant when the real occurrence of vehicle crash is detected by the vehicle-crash detecting device 26 after the bag portions 6a and 7a have been inflated by supplying the inflation air to the bag portions by the blower device 3 as described above, the occupant can be properly restrained in the seat 1 by the inflated seat belt with the properly dispersed restraint force.

Also, according to the embodiment described above, when the high likelihood of the occurrence of vehicle crash is detected by the detecting device 26, at first the inflation air is supplied to the bag portions 6a and 7a of the seat belt from the blower device 3 via the air supply passages 12 and 15 to inflate the bag portions and then the seat belt is wound up by the first pre-tensioner 17. Accordingly, the inflated bag portions 6a and 7a are pressed against the occupant to the large extent when the seat belt is wound up. Thus, the occupant can be prevented effectively from being pressed with a too-large force, and the occupant can be restrained properly and protected safely.

Further, in the above-described embodiment, the amount of the seat belt wound up by the first pre-tensioner 17 is adjusted according to the amount of the air supplied to the bag portions 6a and 7a from the blower device 3 via the air supply passages 12 and 15. Accordingly, the occupant can be prevented effectively from being pressed with an inappropriately large force and an insufficient force, thereby protecting the occupant safely.

For example, the amount of the air supplied to the bag portions 6a and 7a can be determined based on the pressure and the supply period of time of the air to the bag portions 6a and 7a from the blower device 3 via the air supply passages 12 and 15. And, if there is a tendency that the restraint force of the occupant by the seat belt becomes large due to the large amount of the air, the amount of the shoulder belt 6 wound up is set at a small amount, compared with a case where the amount of air is small. Thereby, the occupant can be prevented effectively from being pressed with the inappropriately large force. Meanwhile, if there is a tendency that the restraint force of the occupant by the seat belt becomes small due to the small amount of the air, the amount of the shoulder belt 6 wound up is set at a large amount, compared with a case where the amount of air is large. Thereby, the occupant can be prevented effectively from being pressed with the insufficient force.

Herein, the amount of the gas generated by the inflator 21 of the second pre-tensioner 18 may be adjustable and the amount of the operation to restrain the occupant by the occupant restraint device (the inflator 21 of the second pre-tensioner 18) may be adjusted according to the amount of the air supplied to the bag portions 6a and 7a from the blower device 3 and the amount of the seat belt wound up by the first pre-tensioner 17.

As described above, in the case where the amount of the operation to restrain the occupant by the occupant restraint device comprised of the second pre-tensioner 18 is adjusted according to the amount of the air supplied to the bag portions 6a and 7a and the amount of the seat belt wound up by the first pre-tensioner 17, the restraint force by the restraint device can be adjusted properly and thereby the occupant can be prevented from being pressed with the inappropriately large force, thereby ensuring the safety of the occupant effectively.

Further, in the above-described embodiment, there is provided the failsafe detecting device 29 operative to detect the malfunction of the air supply to the bag portions 6a and 7a from the blower device 3, and when the malfunction of the air supply is detected by the failsafe detecting device 29, the operation of the belt winding by the first pre-tensioner 17 is changed to the manner different from that in the normal state. Accordingly, any problems that, for example, the amount of the belt winding by the first pre-tensioner 17 is set to the too-small amount regardless of the insufficient amount of inflation air supplied to the bag portions 6a and 7a, can be prevented properly.

Namely, as described in the above embodiment, when the malfunction of the air supply is detected by the failsafe detecting device 29, the amount of the shoulder belt 6 wound up by the first pre-tensioner 17 is set at a larger amount than that in the normal state. Thereby, the insufficient restraint force of the occupant due to the insufficient air supplied to the bag portions 6a and 7a can be prevented effectively, and the occupant can be protected properly by the seat belt. Also, when the malfunction of the air supply is detected by the failsafe detecting device 29, the winding speed of the shoulder belt 6 by the failsafe detecting device 29 is set at a slower speed than that in the normal state. Thereby, the uncomfortable feeling of the occupant due to the prompt winding-up of seat belt in the sate where the sufficient inflation air has not supplied yet to the bag portions 6a and 7a can be prevented effectively.

Particularly, according to the embodiment described above, when the malfunction of the air supply is detected by the failsafe detecting device 29, the first pre-tensioner 17 is operated to wind up the shoulder belt 6 after the control to return the bag portions 6a and 7a to the initial state is executed by the air supply control device 4 by operating the blower resource 22 reversely and discharging the air from the bag portions 6a and 7a. Accordingly, the problem that the winding control of the seat belt by the first pre-tensioner 17 would not be executed properly due to the unknown mount of the air supplied to the bag portions 6a and 7a can be prevented.

Figure 10:
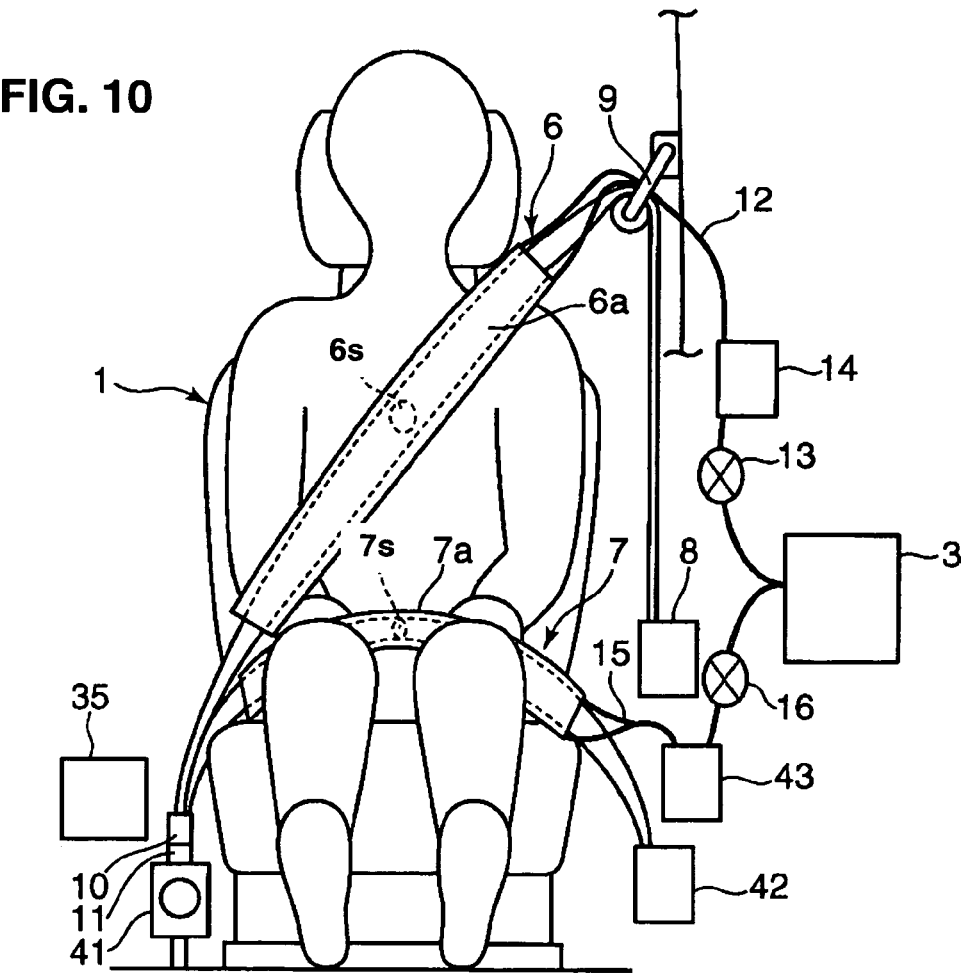
FIG. 10 is an explanatory diagram of another embodiment of the seat belt device for a vehicle according to the present invention.

Instead of the above-described embodiment in which the second pre-tensioner 18 is provided in the retractor 8 of the shoulder belt 6, there may be provided an occupant restraint device, as illustrated in FIG. 10, which comprises an inflator 41 operative to restrain the occupant with the shoulder and lap belts 6 and 7 having the specified tension by drawing the buckle 11 engaged with the tongue provided at the end of the shoulder belt 6 when the vehicle crash is detected. Also, the lap belt 7 may be supported so as to be drawn, and there may be provided a first pre-tensioner 42 operative to wind up the lap belt 7 which is comprised of an electric motor and a retractor 43 operative to wind up the air supply passage 16 for the lap belt 7 according to the winding-up operation of the lap belt 7.

Also, instead of the above-described embodiment in which there are provided the occupant restraint device which comprises the inflators 21 and 41 to restrain the occupant by winding up the shoulder belt 6 when the vehicle crash is detected by the vehicle-crash detecting device 26, there may be provided an occupant restraint device which comprises an inflator to supply gas to the bag portions 6a and 7a of the seat belt via the air supply passages 12 and 15, and the occupant may be restrained with the seat belt by promptly supplying a large amount of air from the inflator to the bag portions 6a and 7a and inflating the bag portions 6a and 7a quickly when the vehicle crash is detected by the vehicle-crash detecting device 26.

Figure 11:
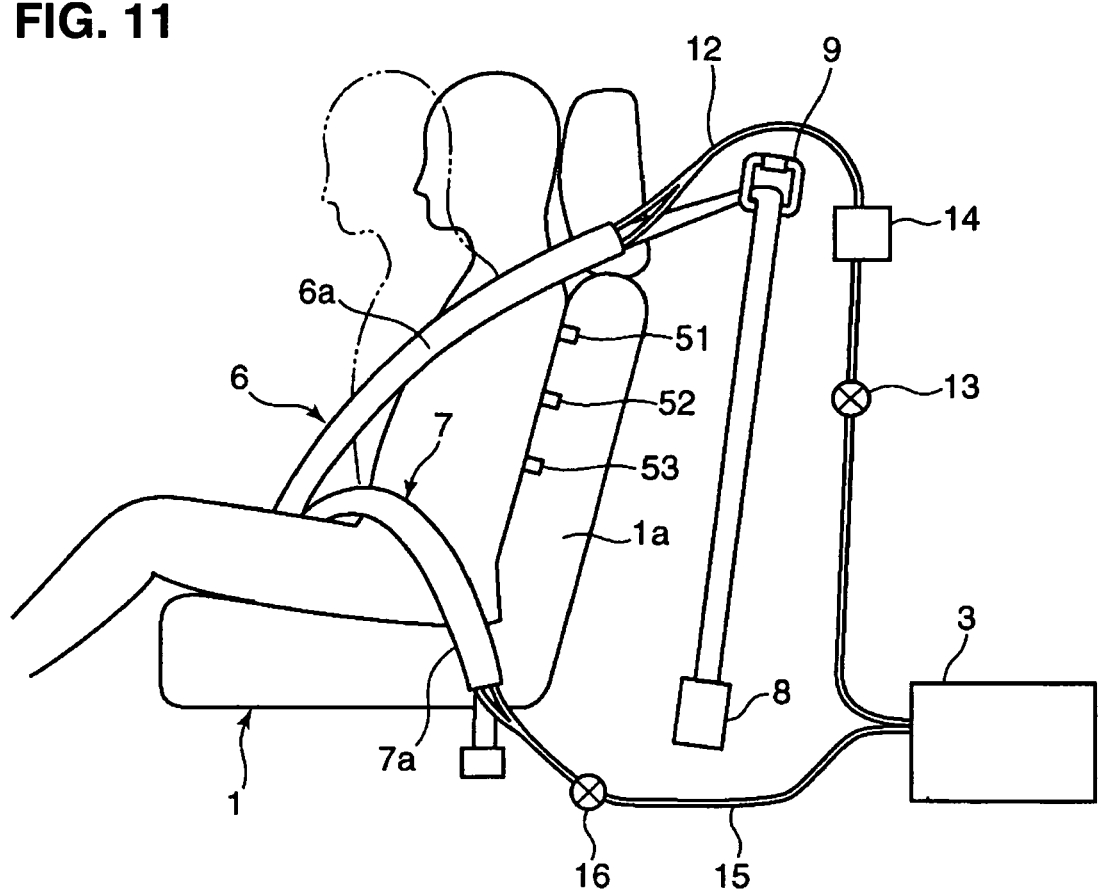
FIG. 11 is an explanatory diagram of further another embodiment of the seat belt device for a vehicle according to the present invention.

Also, as illustrated in FIG. 11, there may be provided seat sensors 51 through 53 at a seat back 1a of the seat 1, which are comprised of a distance sensor to detect the distance from the occupant sitting in the seat 1. Herein, the sitting position of the occupant in the seat 1 is detected based on the detecting signals of the seat sensors 51 through 53. And, the state of the vehicle crash is detected based on the detecting signals of the above-described front-distance detecting device 31, rear-distance detecting device 32 and side-distance detecting device 33, which are constituted of sensing devices provided at the front, the rear and the both sides of the vehicle, such as the supersonic sensor, the infrared sensor or the radar. Thus, the control to change the air supply state to the bag portions 6a and 7a according to the results of the above-described detection may be executed by the air supply control device 4 as illustrated in FIGS. 12 and 13.

Figure 12:
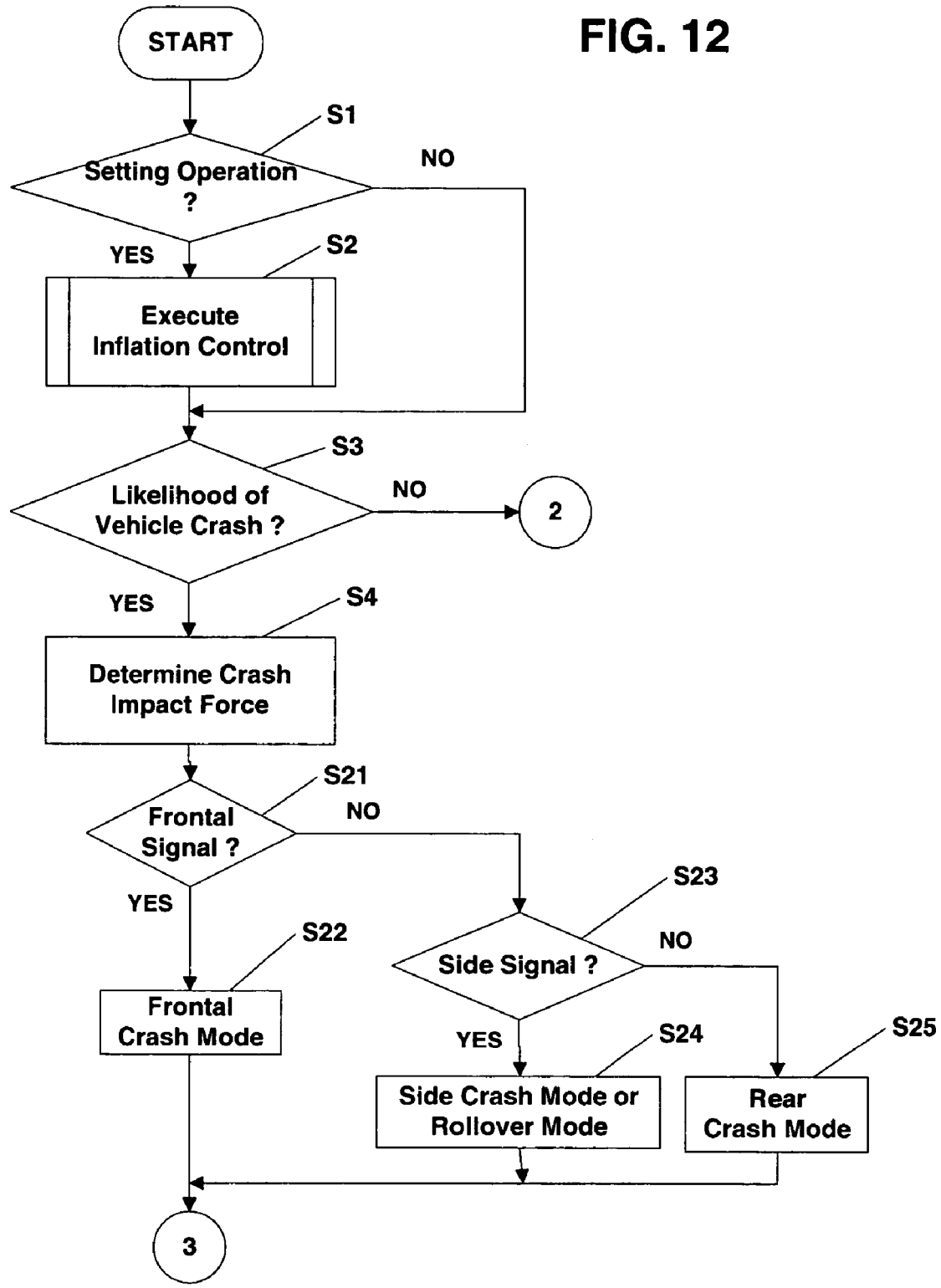
FIG. 12 is a flowchart of another embodiment of the control operation of the seat belt device for a vehicle.
Figure 13:
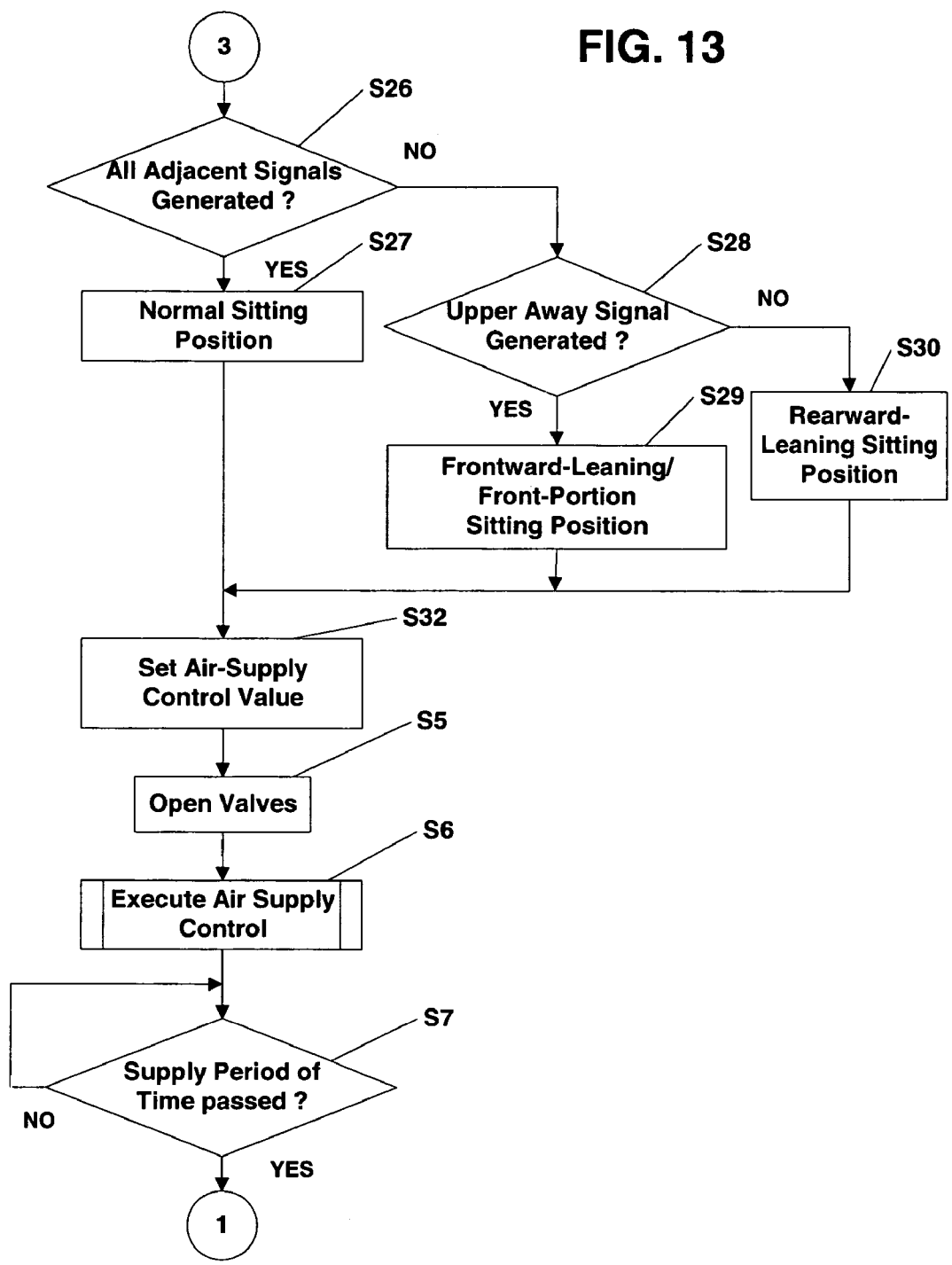
FIG. 13 is a flowchart of another part of the control operation of the embodiment.

Namely, in FIG. 12, after the high likelihood of the vehicle crash is detected with the answer YES to step S3 and the crash impact force is determined in step S4, it is determined whether or the detection of the high likelihood of the vehicle crash is conducted based on the detecting signal (front signal) of the front-distance detecting device 31 (Step S21). When the answer is YES, the vehicle crash detected mode is set at a frontal crash mode (Step S22).

Also, when the answer is NO to step S21, it is determined whether or the detection of the high likelihood of the vehicle crash is conducted based on the detecting signal (side signal) of the side-distance detecting device 33 (Step S23). When the answer is YES, the vehicle crash detected mode is set at a side crash mode or a rollover mode (Step S24). When the answer is NO to step S23 and then it is determined that the detection of the high likelihood of the vehicle crash is conducted based on the detecting signal (rear signal) of the rear-distance detecting device 32, the vehicle crash detected mode is set at a rear crash mode (Step S25).

Next, it is determined whether or not an adjacent signal showing that the distance between the back of the occupant and the seat back 1a of the seat 1 is short is generated from all of the seat sensors 51 through 53 in a state where the seat back 1a is in its upright position (Step S26). When the answer is YES, it is determined that the back of the occupant is in contact with an entire seat back 1a, and thus the current sitting position of the occupant is set at its normal sitting position (Step S27).

Meanwhile, when the answer to step S26 is NO, it is determined whether or not an away signal showing that the distance between the back of the occupant and the seat back 1a is long is generated from the seat sensors 51 located at the uppermost portion (Step S28). When the answer is YES, it is determined that the occupant is in a sitting position where the occupant sits leaning forward or in a front portion of the seat 1, and thus the current sitting position of the occupant is set at a forward-leaning/front-portion sitting position (Step S29). Also, when the answer to step S28 is NO, it is determined that the occupant is in a sitting position where the occupant sits leaning rearward, and thus the current sitting position of the occupant is set at a rearward-leaning sitting position (Step S30).

Then, the control value to control the air supply characteristics, namely the supply timing and the supply pressure of the air to be supplied to the bag portions 6a and 7a of the shoulder belt 6 and the lap belt 7 are obtained from a predetermined control map based on determination results of the above-described crash modes and sitting positions and the control value is set (Step S32).

The above-described control map is set, for example, as shown in FIG. 14, with a control parameter of the crash modes at the high likelihood of the vehicle crash and the sitting positions of the occupant. Herein, for example, when the occupant is in the normal sitting position and the crash mode is the frontal crash mode, the control value is set such that the control value S for the shoulder belt 6 is greater than the control value R for the lap belt 7. This means that the supply timing and the supply pressure of the air supplied to the bag portion 6a of the shoulder bag 6 is set at an earlier timing and a higher pressure than those of the air supplied to the bag portion 7a of the lap belt 7. Accordingly, when the high likelihood of the frontal vehicle crash is detected while the occupant is in the normal sitting position, the shoulder and chest of the occupant can be restrained effectively by the shoulder belt 6.

Also, when the occupant is in the normal sitting position and the crash mode is the side crash mode or the rollover mode, the control value is set oppositely such that the control value S for the shoulder belt 6 is smaller than the control value R for the lap belt 7. Accordingly, when the side vehicle crash or the rollover of the vehicle are detected while the occupant is in the normal sitting position, the stomach and waist of the occupant can be restrained effectively by the lap belt 7. Further, when the occupant is in the normal sitting position and the crash mode is the rear crash mode, the control value is set such that the control value S for the shoulder belt 6 is equal to the control value R for the lap belt 7. Accordingly, the occupant can be restrained effectively by both the shoulder belt 6 and the lap belt 7.

Meanwhile, when the occupant is in the above-described forward-leaning position or front-portion sitting position and the crash mode is the frontal crash mode, the control value is set such that the control value S for the shoulder belt 6 is extremely greater than the control value R for the lap belt 7. This means that the supply timing and the supply pressure of the air supplied to the bag portion 6a of the shoulder bag 6 is set at a much earlier timing and a much higher pressure than those of the air supplied to the bag portion 7a of the lap belt 7. Accordingly, when the high likelihood of the frontal vehicle crash is detected while the occupant is in the forward-leaning or front-portion sitting positions, the shoulder and chest of the occupant can be restrained further promptly and effectively by the shoulder belt 6.

Also, when the occupant is in the forward leaning or front-portion sitting positions and the crash mode is the side crash mode or the rollover mode, the control value is set such that the control value S for the shoulder belt 6 is equal to the control value R for the lap belt 7. Accordingly, the occupant can be restrained effectively by both the shoulder belt 6 and the lap belt 7. Further, when the occupant is in the forward-leaning or front-portion sitting positions and the crash mode is the rear crash mode, the control value is set such that the control value S for the shoulder belt 6 is greater than the control value R for the lap belt 7. Accordingly, the shoulder and chest of the occupant can be restrained effectively by the shoulder belt 6.

Meanwhile, when the occupant is in the rearward-leaning position and the crash mode is the frontal crash mode, the control value is set such that the control value S for the shoulder belt 6 is equal to the control value R for the lap belt 7. Accordingly, the occupant can be restrained effectively by both the shoulder belt 6 and the lap belt 7. Also, when the occupant is in the rearward-leaning position and the crash mode is the side crash mode or the rollover mode, the control value is set such that the control value S for the shoulder belt 6 is extremely smaller than the control value R for the lap belt 7. Accordingly, the stomach and waist of the occupant can be restrained further promptly and effectively by the lap belt 7. Further, when the occupant is in the rearward-leaning sitting position and the crash mode is the rear crash mode, the control value is set such that the control value S for the shoulder belt 6 is smaller than the control value R for the lap belt 7. Accordingly, the stomach and waist of the occupant can be restrained effectively by the lap belt 7.

And, the control signal to open the valves 13 and 16 is generated by the valve control device 27 (Step S5), and the control signal to operate the blower device 3 and supply the air to the bag portions 6a and 7a of the seat belt is executed by the air supply control device 4 (Step S6). The air supply to the bag portions 6a and 7a of the belts 6 and 7 with the air supply timing and the air supply pressure which have been set in the above-described step S32 is executed.

Also, it is determined by the air supply control device 4 whether the condition for the air-supply stopping is satisfied or not by determining whether or not the predetermined supply period of time has passed after the air supply to the bag portions 6a and 7a had started (Step S7). When the passage of the predetermined period of time after the start of the air supply is determined and the answer to step S7 is YES, the control sequence proceeds to the above-described step S8 in FIG. 8.

According to the above-described constitution in which the control value of the supply timing and the supply pressure of the air to be supplied to the bag portions 6a and 7a of the shoulder belt 6 and the lap belt 7 are obtained from the predetermined control map based on the determination results of the above-described crash modes and sitting positions, the winding state of the seat belt can be controlled based on the vehicle crash state and the occupant sitting position, and thereby the occupant can be protected safely.

Herein, the seat belt of the embodiment descried above is a continuous type of belt in which the shoulder belt 6 and the lap belt 7 are made of single webbing and the length of the both belts 6 and 7 can be adjusted by the location of the tong with a slip guide. However, the seat belt may be also made of a separate type of belt in which the ends of the shoulder belt and the lap belt are coupled to the tongue respectively.

Next, the specific structure of another embodiment of the seat belt will be described referring to FIGS. 15A, 15B, 15C through 21. Herein, substantially the same constitution as that of the above-described embodiment will be denoted by the same reference numerals.

Figure 16:
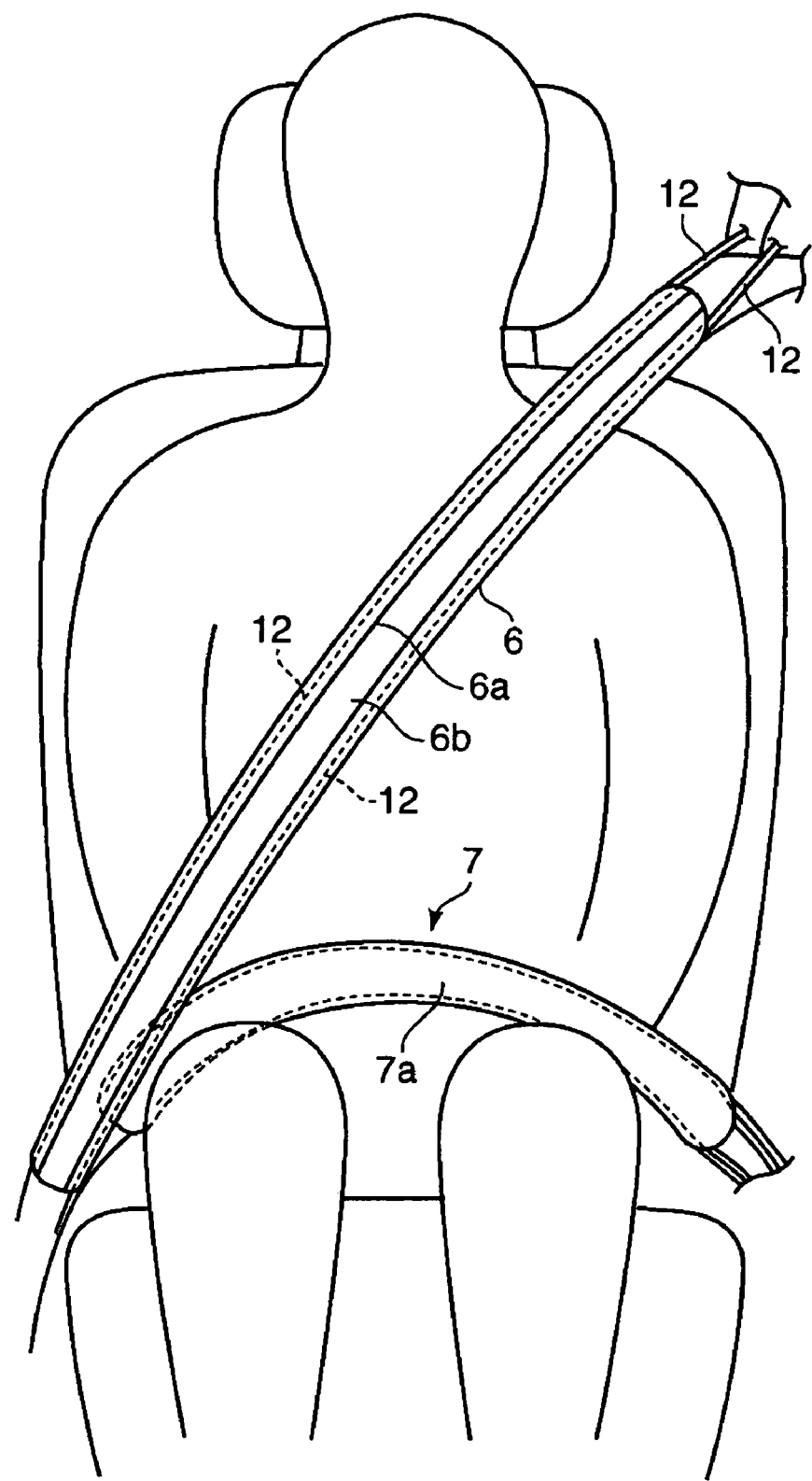
FIG. 16 is an enlarged elevation view of an entire structure of the seat belt.

The shoulder belt 6 of this embodiment comprises a pair of bag portions 6a which is provided so as to be separate from each other in the width direction of the seat belt and a connection portion 6b which interconnects the bag portions 6a, and it is applied in such a manner that the bag portions 6a are located at the shoulder and chest of the occupant, as illustrated in FIG. 16. Specifically, the bag portions 6a are provided at the lateral both ends of the shoulder belt 6 and in the longitudinal direction of the shoulder belt 6 from the end portions at the tong 10 to the support portion at the anchor 9 of the belt. Although the connection portion 6b may be constituted so as to just interconnect the bag portions 6a, it is constituted such that the air is supplied therein in the present embodiment. And, the connection portion 6b is constituted so as to be inflated by the air supplied from the bag portions 6a when the air pressure exceeds a specified pressure. Herein, the maximum amount of air to be supplied to the connection portion 6b in the embodiment is set at a smaller amount than the total amount of air supplied to the bag portions 6a under a specified pressure when the air supply to the connection portion 6b starts.

Figure 15A:
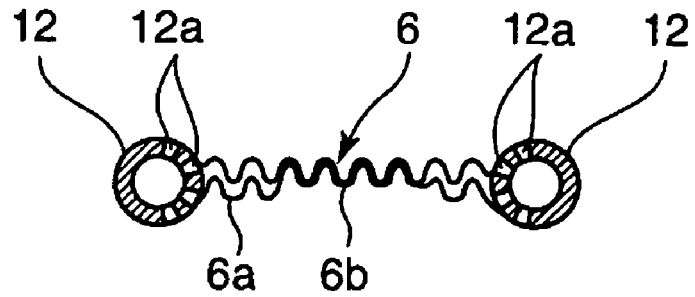
FIGS. 15A, 15B and 15C are explanatory diagrams illustrating a specific structure of another embodiment of the shoulder belt.
Figure 15B:
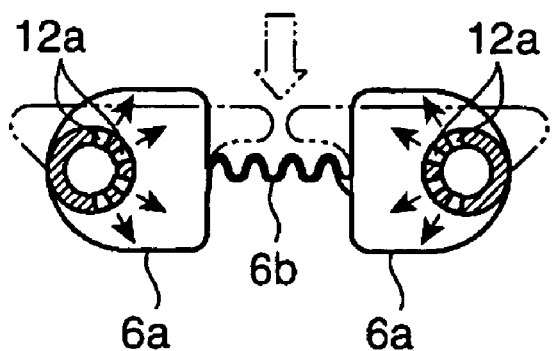
Figure 15C:
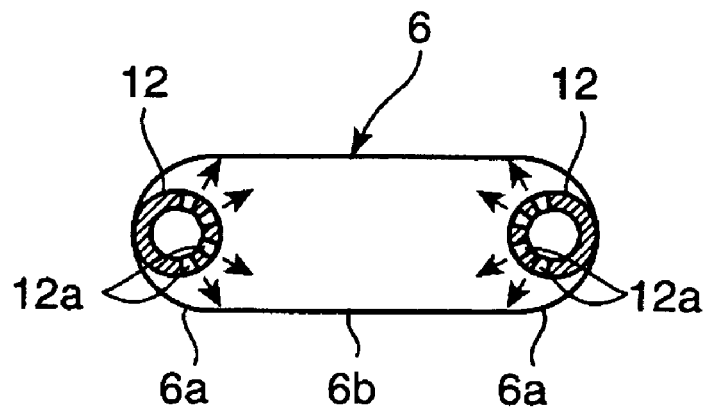

Namely, the bag portions 6a and the connection portion 6b are made of a bag material as illustrated in FIG. 15C. Inner-wall faces of portions of the bag material which corresponds to the connection portion 6b adhere to each other, and these portions are separated from each other when the air with the specified pressure acts and thereby the connection portion 6b is inflated. More specifically, at first the bag portions 6a and the connection portion 6b change from their deflated state illustrated in FIG. 15A to the inflated state having its thickness being expanded outward illustrated in FIG. 15B by the air supplied to the bag portions 6a. Then, the air pressure in the bag portions 6a increases as the air is further supplied, and when the air pressure in the bag portions 6a exceeds the specified pressure, the inner faces of the connection portion 6b are separated and the connection portion 6b is also inflated outward as illustrated in FIG. 15C.

Herein, since the bag material constituting the bag portions 6a and the connection portion 6b is constituted so as to be inflated in its thickness direction, the width of the shoulder belt 6 does not change substantially after the inflation. Also, there is provided an adhesive at the inner faces of the connection portion 6b so that the both inner faces can adhere to each other again when the inflation air has been discharged and the inner faces contact with each other.

The air supply to the bag portion 6a is done via the air supply passages 12 provided in the right and left bag portions 6. Each of the air supply passages 12 is comprised of a tube member with a circular section which is made of a material (for example, reinforced rubber) having a specified tension strength in the longitudinal direction and maintains its form still in a state where no air is supplied in it. The sir supply passage 12 is provided in such a manner that its portion which corresponds to the bag portion 6a extends along the inside of the outer end portion of the bag portion 6a longitudinally. And, a plurality of air introducing holes 12a are formed at the periphery of the air supply passage 12 along its peripheral direction (four holes in the present embodiment). These holes 12a are also made along the longitudinal direction of the respective passage 12 at specified intervals (at equal intervals in the present embodiment) so that the air supplied via these holes can inflate the bag portions 6a along the longitudinal direction. Herein, the opening direction of the air introducing holes 12a is provided so as to be directed toward the outside of the bag portions 6a so that the bag portions 6a can be easily inflated toward its thickness direction.

In this embodiment, like the previous embodiment decried above, when the blower device 3 is operated while the valve 13 is opened, the pressured air is supplied to the bag portions 6a via the air introducing holes 12a formed at the periphery of the air supply passages 12. Thereby, the bag portions 6a are inflated as illustrated in FIG. 15B. Then, as the pressured air is further supplied, the inner-wall faces of the connection portion 6b are separated from each other, so that the bag portions 6a are inflated with the connection portion 6b expanded as illustrated in FIG. 15C. In this state, when the valve 13 is closed off, the inflation of the bag apportions 6a and connection portion 6b illustrated in FIG. 15C is maintained. The inflation from the state of FIG. 15A to the state of FIG. 15B can be performed relatively quickly because the volume to be inflated is relatively smaller than the whole volume of the bag portions 6a and the connection portion 6b, thereby forming the proper inflated state of the bag portions promptly.

Also, the blower device 3 and the air supply passages 12 function as the air discharge device to discharge the air out of the bag portions 6a, and when the blower device 3 is operated while the valve 13 is opened, the air is discharged from the bag portions 6a and the connection portion 6b, and thereby the bag portions 6a and the connection portion 6b are returned to the state of FIG. 15A. In this state, the connection portion 6b is returned to its original state where the inner-wall portions of the connection portion 6b adhere to each other.

Figure 17A:
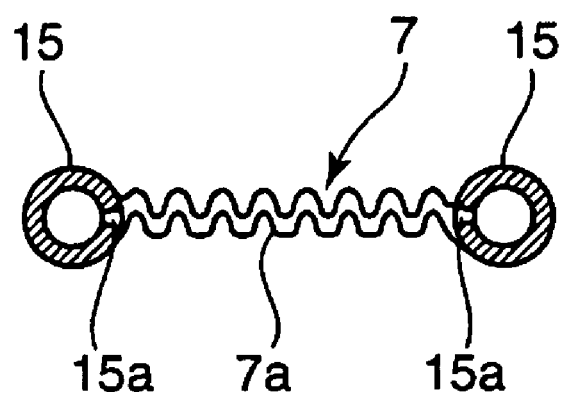
FIGS. 17A and 17B are explanatory diagrams illustrating a specific structure of the lap belt.

The lap belt 7 includes the bag portion 7a, to which the air is supplied, which contacts the occupant's stomach and waist. The bag portion 7a is in its shrunk state originally where the both inner-wall portions thereof substantially contact each other as illustrated in FIG. 17A. And, it is inflated from the shrunk state to the inflated state illustrated in FIG. 17B by the air supplied. A pair of air supply passages 15 comprised of the tube members is provided in the bag portion 7a at both ends in the width direction, and their portions which correspond to the bag portion 7a extend along the inside of the bag portion 7a longitudinally. And, a plurality of air introducing holes 15a to introduce the air are formed at the portions of the air supply passages 15 corresponding to the bag portion 7a along their longitudinal direction at specified intervals (at equal intervals in the present embodiment), so that the air supplied via these holes can inflate the bag portions 7a along the longitudinal direction. Herein, the opening directions of the air introducing holes 15a are provided so as to oppose each other, so that the bag portion 7a can be quickly inflated toward its width direction by the air from the air introducing holes 15a. Also, the air supply passages 15 are coupled to the blower device 3 like the air supply passages 12 of the shoulder belt 6 and includes the valve 16 to open and close the passage.

Figure 17B:
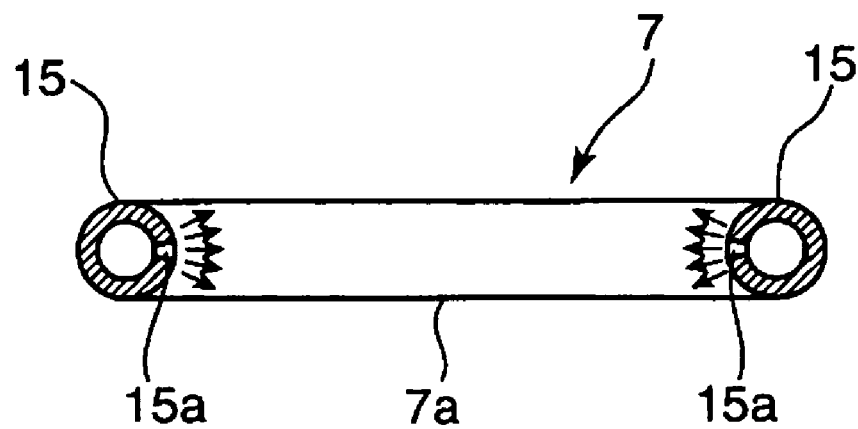

Herein, when the blower device 3 is operated while the valve 16 is opened, the pressured air is supplied to the bag portion 7a via the air introducing holes 15a formed at the periphery of the air supply passages 15. Thereby, the bag portion 7a is inflated with the width increased as illustrated in FIG. 17B. In this state, when the valve 13 is closed off, the inflation of the bag apportion 7a is maintained. Herein, although the bag portion 7a is expanded in the thickness direction by the air supplied, the thickness of the inflated state is constituted so as to be substantially equal to the diameter of the air supply passages 15 in the present embodiment. Also, the blower device 3 and the air supply passages 15 function as the air discharge device to discharge the air out of the bag portion 7a, and when the blower device 3 is operated while the valve 16 is opened, the air is discharged from the bag portion 7a, and thereby the bag portion 7a is returned to the shrunk state of FIG. 17A.

The seat belt device for a vehicle described above is one embodiment of the device to which the seat belt device according to the present invention, and the concrete structures of the device can be modified within the scope of a sprit of the present invention. Such modified embodiments will be described below.

Figure 18:
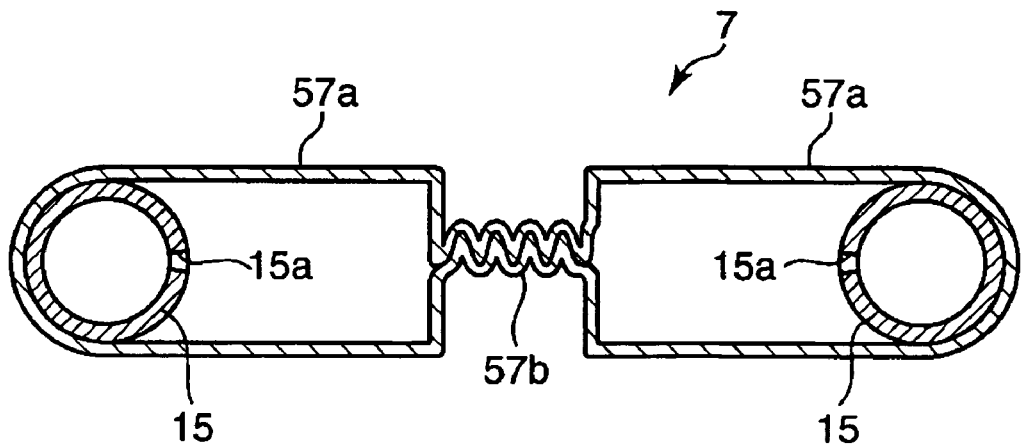
FIG. 18 is a sectional view of a modified belt lap.

(1) The specific structure of the seat belt is not limited to the above-described embodiment. For example, the lap belt 7 having bag portions separated from each other in the width direction like the shoulder belt may be applied. Namely, as illustrated in FIG. 18, the lap belt 7 includes two bag portions 57a which are located at the lateral both ends and a connection portion 57b which interconnects the bag portions 57a.

The connection 57b forms a bag-shaped material with the bag portions 57a and is configures so as to introduce the air to the inside. The connection portion 57b is in its original shrunk state where its inner-wall portions adhere to each other, and when the inner pressure by the air supplied reaches a specified pressure, the inner-wall potions of the connection portion 57b are separated from each other. Accordingly, the bag portions 57a are inflated by the air supplied therein. The belt width of the lap belt 7 is expanded through the changing from the shrunk state to the inflated state, and thereby the contact face between the belt and the occupant can be enlarged and the crash impact force applied to the occupant via the belt can be dispersed properly.

According to the lap belt 7 with the above-described structure, the bag portions are provided over the entire width of the belt and these bag portions are inflated entirely when the vehicle crash occurs. Thus, the width of the belt can be expanded quickly and widely so that the effect of crash impact absorption can be obtained.

Figure 19A:
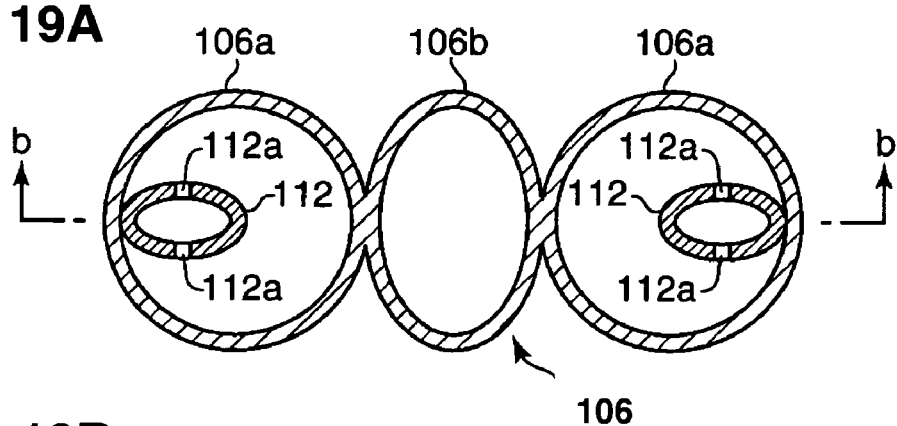
FIGS. 19A and 19B are sectional views of another modified shoulder belt.
Figure 19B:
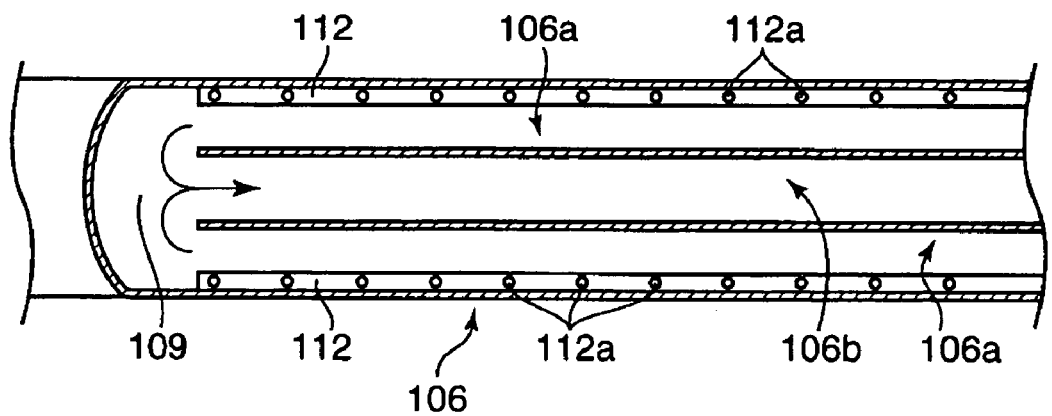

Also, the shoulder belt may be constituted as illustrated in FIGS. 19A and 19B, in which bag portions 106a are provided at both ends of a belt 106 so as to form independent space in the inflated state and a connection potion 106b is provided between the both bag portions 106a as a auxiliary chamber which is inflated after the bag portions 106a have been inflated until a certain shape.

Namely, this shoulder belt 106 includes the bag portions 106a at the both ends in which air supply passages 112 are provided and the connection portion 106b which interconnect these bag portions 106a, which are separated form each other independently. Herein, the air supply passages 112 are formed with an oval-shaped cross section unlike the above-described embodiment, and air introducing holes 112a are formed at the air supply passages 112 so as to open in the longitudinal direction of the vehicle.

The respective bag portions 106a are coupled to the connection portion 106b via a connecting portion 109 at one end (an end at the side of tongue 10 opposite to the other end at the side of anchor 9) as illustrated in FIG. 19B. Accordingly, when the air is supplied to the air supply passages 112 from the blower device 3 by the air supply control device 4, the air is introduced into the bag portions 106a via the plural air introducing holes 112a formed longitudinally. Thus, the bag portions 106a are inflated substantially uniformly along the longitudinal direction. Then, when the bag portions 106a has been inflated until the certain shape, the air in the bag portions 106a flows into the connection portion 106b via the connecting portion 109, thereby inflating the connection portion 106b as well. The connection portion 106b starts inflating from the side of the location of the connecting portion 109 where the air is supplied from the bag portions 106a. Herein, the bag portions 106a can be inflated quickly and efficiently, and thereby the effects of the crash absorption and the pre-tensioner can be obtained surely and properly even if the period of time from a certain timing, such as the determination of high likelihood of vehicle crash, to a timing when the crash impact force is applied to the occupant via the seat belt is unexpectedly short. Thus, the occupant can be protected properly and effectively.

Figure 20:
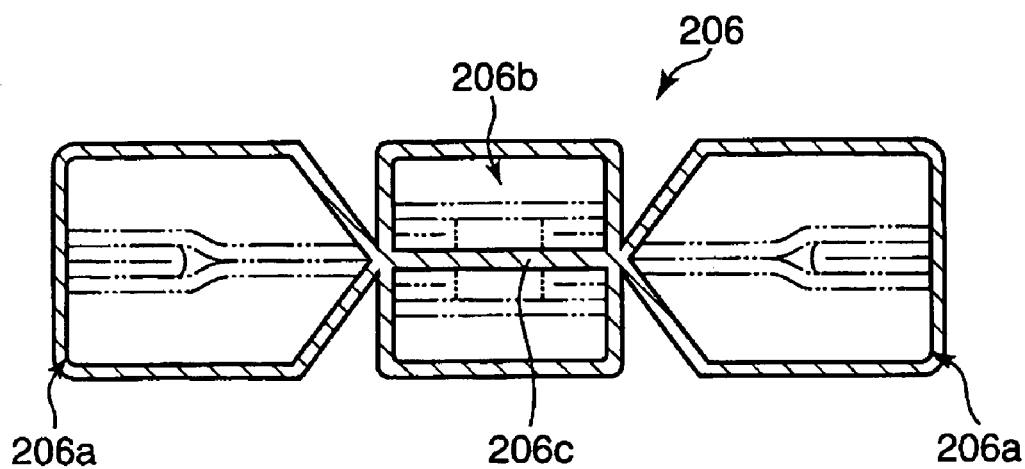
FIG. 20 is a sectional view of further another modified shoulder belt.
Figure 21:
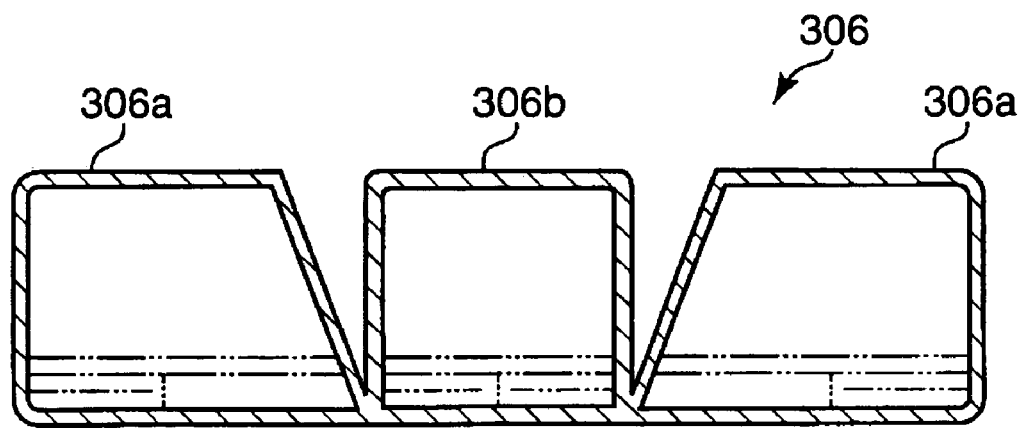
FIG. 21 is a sectional view of further another modified shoulder belt.

Further, the bag portion may be constituted as illustrated in FIGS. 20 and 21.

Namely, FIG. 20 is a sectional view showing another embodiment of the bag portion of the shoulder belt. A shoulder belt 206 of this embodiment includes bag portions 206a provided at the both end and a connection portion 206b interconnecting these bag portions 206a, and the air supply passage 12 is not provided in the bag portions 206a, but coupled to one end of the bag portions 206a, unlike the above-described embodiment. However, the air supply passage 12 may be provided in the bag portions 206a like the above-described embodiment.

The bag portions 206a and the connection portion 206b are comprised of an independent bag-shaped material respectively so as to receive the air supplied therein, and these are connected at an opposite end side to one end to which the air supply passage 12 is coupled, as illustrated in FIG. 19B. The bag portions 206a are constituted such that their cross section while being inflated is formed as illustrated in FIG. 20 and they are folded in the shrunk state as shown by two-dotted broken lines in FIG. 20. Then, when the air is supplied, the folded bag portions 206a are inflated. Meanwhile, the inside of the connection portion 206b is separated into two chambers by a partition wall 206c which are coupled to the connecting portion respectively. Also, the connection portion 206b is folded in the shrunk state as shown by two-dotted broken lines in FIG. 20, and when the air is supplied, the connection portion 206b is inflated.

Accordingly, at first the bag portions 206a of the shoulder belt 206 are inflated outward in the thickness direction from its shrunk state shown by the two-dotted broken line in FIG. 20 by the air supplied from its one end. Then, after the bag portions 206a have been inflated until the certain shape, the air pressure in the bag portions 206a reaches the specified pressure, and thereby the air is supplied to the connection portion 206b via the connecting portion. Thus, the connection portion 206b is inflated from its shrunk state outward in the thickness direction.

Meanwhile, FIG. 21 is a sectional view showing further another embodiment of the bag portion of the shoulder belt. A shoulder belt 306 of this embodiment is constituted such that bag portions 306a and a connection portion 306b are inflated toward one side in the thickness direction, for example, toward the occupant by the supplied air, unlike the shoulder belt 206 illustrated in FIG. 20 in which the bag portions 206a and the connection portion 206b are inflated from its shrunk state toward both sides in the thickness direction by the supplied air. Accordingly, since the expanded portion having the sufficient elasticity is located at the side of the occupant, the effect of impact absorption for the occupant can be improved.

(2) Although the sectional shape of the air supply passage of the above-described embodiments is the circle or the oval, it may be other shapes, such as half circle, rectangle, or triangle.

Herein, the arc sectional shape such as circle, oval, or half circle could provide the comfortable application of the seat belt to the occupant. Particularly, the substantially circular sectional shape such as circle or oval could improve the safe seat belt application properly. Also, the proper air supply via the passages 12 and 15 could be maintained properly preventing the deformation of the passages.

Also, the number or the opening direction of the air introducing holes 12a and 15a formed at the air supply passages 12 and 15 should not be limited to particular number or direction. Namely, although the plural air introducing holes 12a are formed along the periphery of the air supply passages 12 for the shoulder belt 6 in the above-described embodiment, for example, a single hole may be formed along the periphery of the passages. Also, the opening direction of the holes may be directed toward the center of the bag portions 6a like the above-described air introducing holes 15a of the air supply passages 15 for the lap belt 7.

Further, although the air introducing holes 12a and 15a are respectively formed along the longitudinal directions of the air supply passages 12 and 15 at equal intervals in the above-described embodiment, they may be formed at unequal intervals. For example, the intervals of the location of the holes may be constituted so as to become shorter from the one side near the blower device 3 toward the other end.

Figure 22:
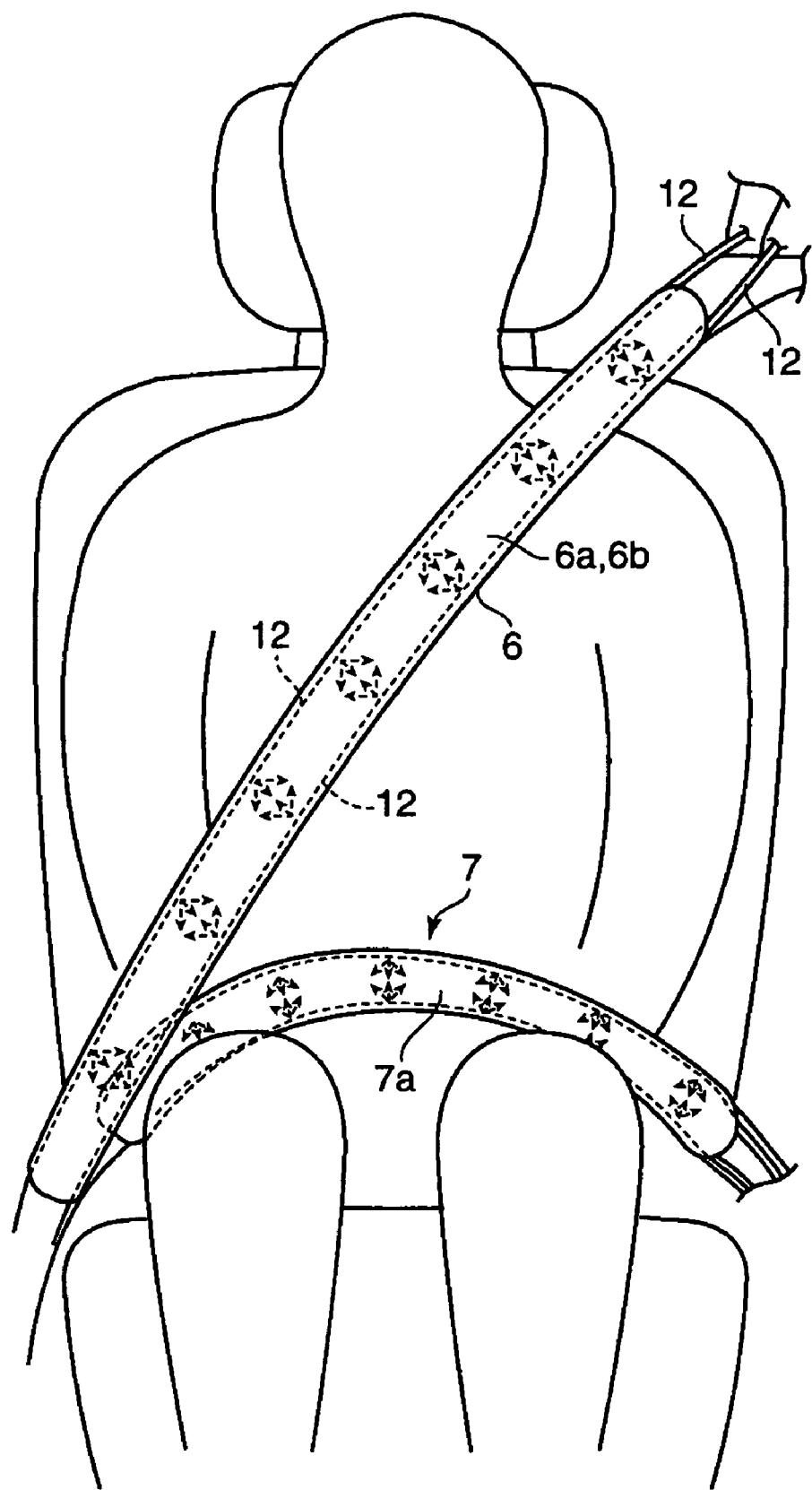
FIG. 22 is an elevation view schematically illustrating a state of air supplied to a bag portion of the seat belt via through holes.

Herein, the above-described state, in which the air supply passages 12 are provided in the bag portions 6a in such a manner that their portions corresponding to the bag portions 6a extend longitudinally inside the outside end portions of the bag portions 6a, and the air introducing holes 15a to introduce the air into the bag portion 7a are formed at specified intervals (at equal intervals in the present embodiment) so that the air supplied via these holes can inflate the bag portions 7a along the longitudinal direction, is expressly illustrated in FIG. 22.

The air supply characteristics to the shoulder belt and lap belt may be controlled based on the vehicle operation condition. This embodiment will be described referring to FIGS. 23 through 32. Herein, the same structures as the above-described embodiment are denoted by the same reference numerals or characters.

Figure 23:
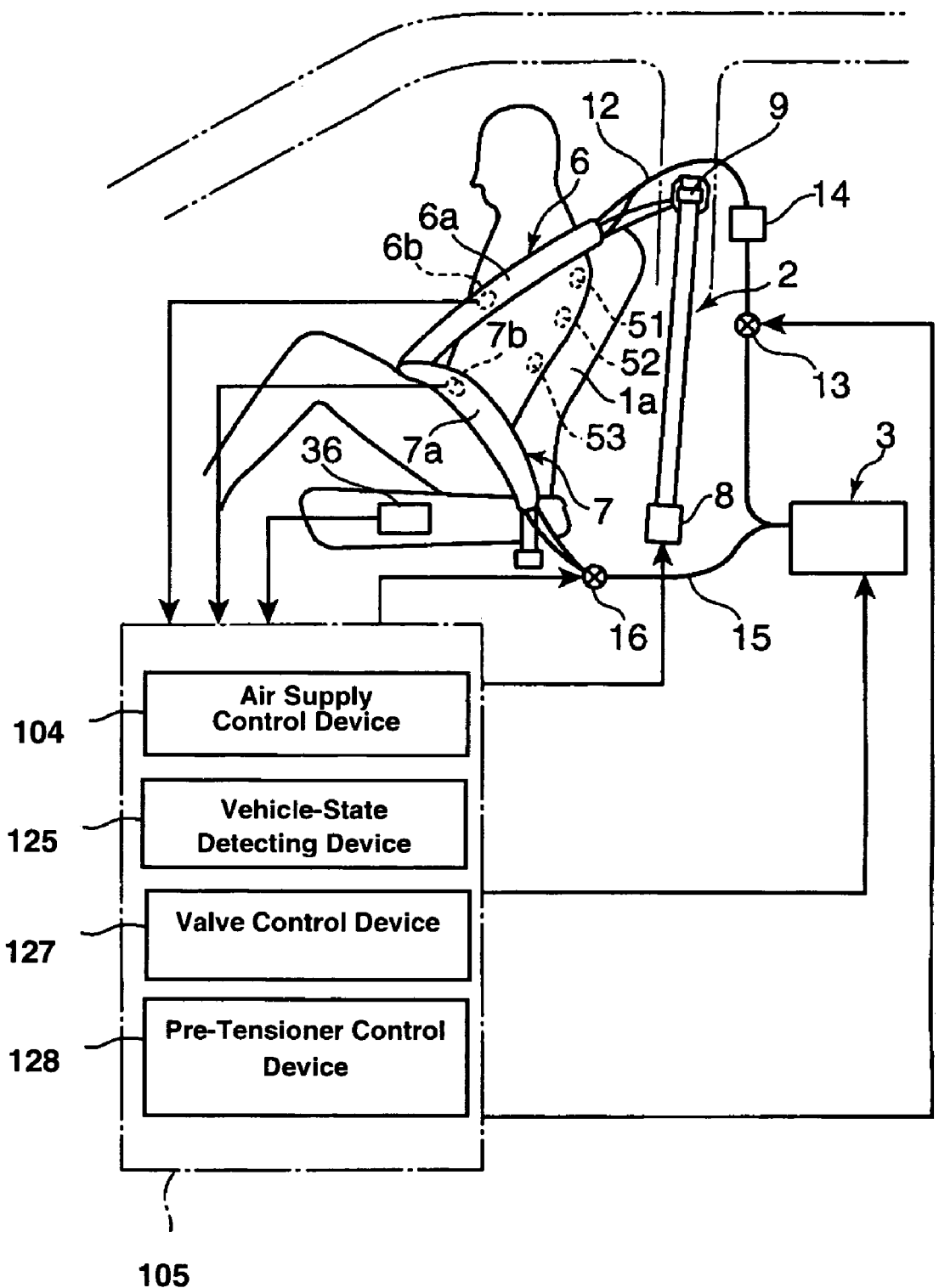
FIG. 23 is an explanatory diagram of further another embodiment of the seat belt device for a vehicle according to the present invention.
Figure 24:
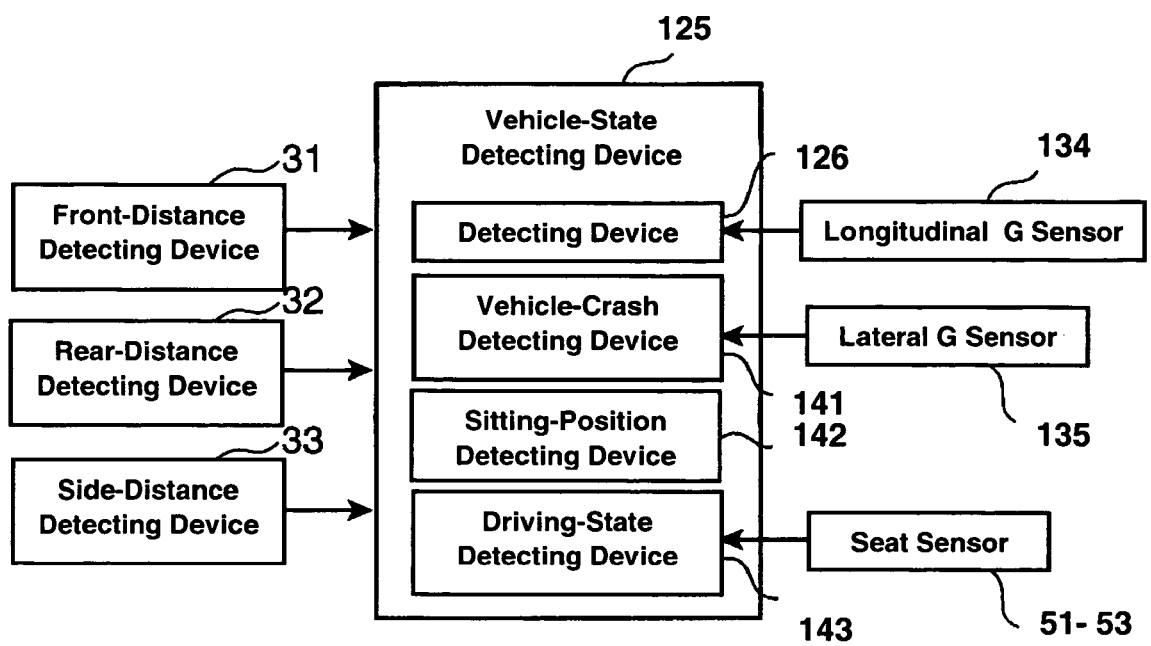
FIG. 24 is a block diagram illustrating a specific structure of another embodiment of the control unit.

Namely, a control unit 105 includes, as illustrated in FIG. 23, a vehicle-state detecting device 125 to detect a vehicle state, a valve control device 127 to generate a control signal to the above-described valves 13 and 16 for opening or closing, and a pre-tensioner control device 128 to generate an operational instruction signal to the above-described first and second pre-tensioner 17 and 18. Also, the above-described vehicle-state detecting device 125 includes, as illustrated in FIG. 24, a detecting device 126 to detect the high likelihood of the occurrence of vehicle crash and detect the crash mode, a crash detecting device 141 to detect the vehicle crash state, a sitting-position detecting device 142 to detect a sitting position of the occupant on the seat 1, and a driving-state detecting device 143 to detect a driving state of the vehicle.

The detecting device 126 detects the high likelihood of the occurrence of the vehicle crash based on detecting signals of the front-distance detecting device 31, the rear-distance detecting device 32 or the side-distance detecting device 33, which are constituted of sensing devices provided at the front, the rear and the both sides of the vehicle, such as the supersonic sensor, infrared sensor or radar to detect the relative distance or relative speed with another vehicle located at the front, the rear or the sides of the vehicle. When the detecting device 126 detects the high likelihood of the vehicle crash occurrence, it generates the detecting signal of the high likelihood of vehicle crash and supplies it to the above-described air supply control device 104 and the valve control device 127. Also, the detecting device 126 detects the crash impact force based on the above-described signals and the vehicle crash mode, which will be described below, and generates the detecting signals of the crash impact force and crash mode and supplies them to the air supply control device 104.

The vehicle-crash detecting device 141 determines that the vehicle crash occurs when the action of the large impact load is detected based on detecting signals from a longitudinal G (accelerator) sensor 134 and a lateral G (accelerator) sensor 135 which are provided at the vehicle, and generates the crash detecting signal and supplies it to the valve control device 127 and the pre-tensioner control device 128.

The sitting-position detecting device 142 detects the sitting position of the occupant on the seat 1 based on output signals of seat sensors 51 through 53 which are comprised of distance sensors which are provided at three points of the seat back 1a and detect each distance between the occupant and the seat back 1a. The detecting signal generated by the sitting-position detecting device 142 is supplied to the air supply control device 104.

The driving-state detecting device 143 detects whether or not the driving state is in a state where a quick braking is operated or where a quick handling is operated based on the detecting signals of the longitudinal G sensor 134 and the lateral G sensor 135, and generates the detecting signal and supplies it to the air supply control device 104 at need.

The valve control device 127 generates the opening signal and supplies this signal to the valves 13 and 16 to open these valves when the detecting signal of the high likelihood of vehicle crash is received from the detecting device 126. The valve control device 127 also determines whether a predetermined supply period of time has passed or not after the air supply from the air supply control device 104 to the bag portions 6a and 7a of the seat belt had started. And, the valve control device 127 generates a closing signal and supplies this signal to the valves 13 and 16 to close these valves when the supply period of time has passed. Herein, the supply period of time is set at a proper period of time based on the pressure of the supply air supplied from the blower device 3 which can properly inflate the bag portions 6a and 7a by supplying the inflation air to the bag portions 6a and 7a of the seat belt.

Also, the air supply control device 104 generates a switching signal and supplies this signal to the switching valve 24 to connect the accumulator 23 of the blower device 3 with the air supply passages 12 and 15 when the detecting signal of the high likelihood of vehicle crash is received from the detecting device 126, thereby supplying the pressured air from the accumulator 23 to the bag portion 6a of the shoulder belt 6 and 7a of the lap belt 7 via the air supply passages 12 and 15. And, when the predetermined supply period of time has passed after the pressured air supply had started, the air supply control device 4 generates a switching signal to connect the blower resource 22 of the blower device 3 with the air supply passages 12 and 15 and supplies this signal to the switching valve 24, and generates an operation signal to operate the blower resource 22. And, the air supply control device 104 adjusts the rotational speed of the blower resource 22 according to the crash impact force detected by the detecting device 126.

Further, the air supply control device 104 executes a control to change a characteristic of the air supply to the bag portions 6a and 7a of the seat belt, namely an air supply timing and air supply pressure based on the vehicle crash mode detected by the detecting device 126 and the occupant sitting position detected by the sitting-position detecting device 142.

Also, there is provided a setting switch 36 to supply the inflation air to inflate the bag portions 6a and 7a of the seat belt at the side portion of the seat 1. When the setting switch 36 is operated, the blower resource 22 of the blower device 3 is operated in a state where the blower resource 22 is connected with the air supply passages 12 and 15, and thereby a certain amount of pressured air is supplied to the bag portions 6a and 7a of the seat belt to inflate the bag portions.

The above-described pre-tensioner control device 128 generates a control signal to operate the first pre-tensioner 17 and winds up the shoulder belt 6 after the above-described inflation control of the bag portions 6a and 7a has been conducted by the air supply control device 104 when the high likelihood of vehicle crash had been detected. The pre-tensioner control device 128 also generates an operational signal to operate the inflator 21 of the second pre-tensioner 18 and makes the inflator 21 generate operational gas when the vehicle crash is detected by the vehicle-crash detecting device 141, thereby winding up the shoulder belt 6 promptly and restraining the occupant with a proper restraint force.

Figure 25:
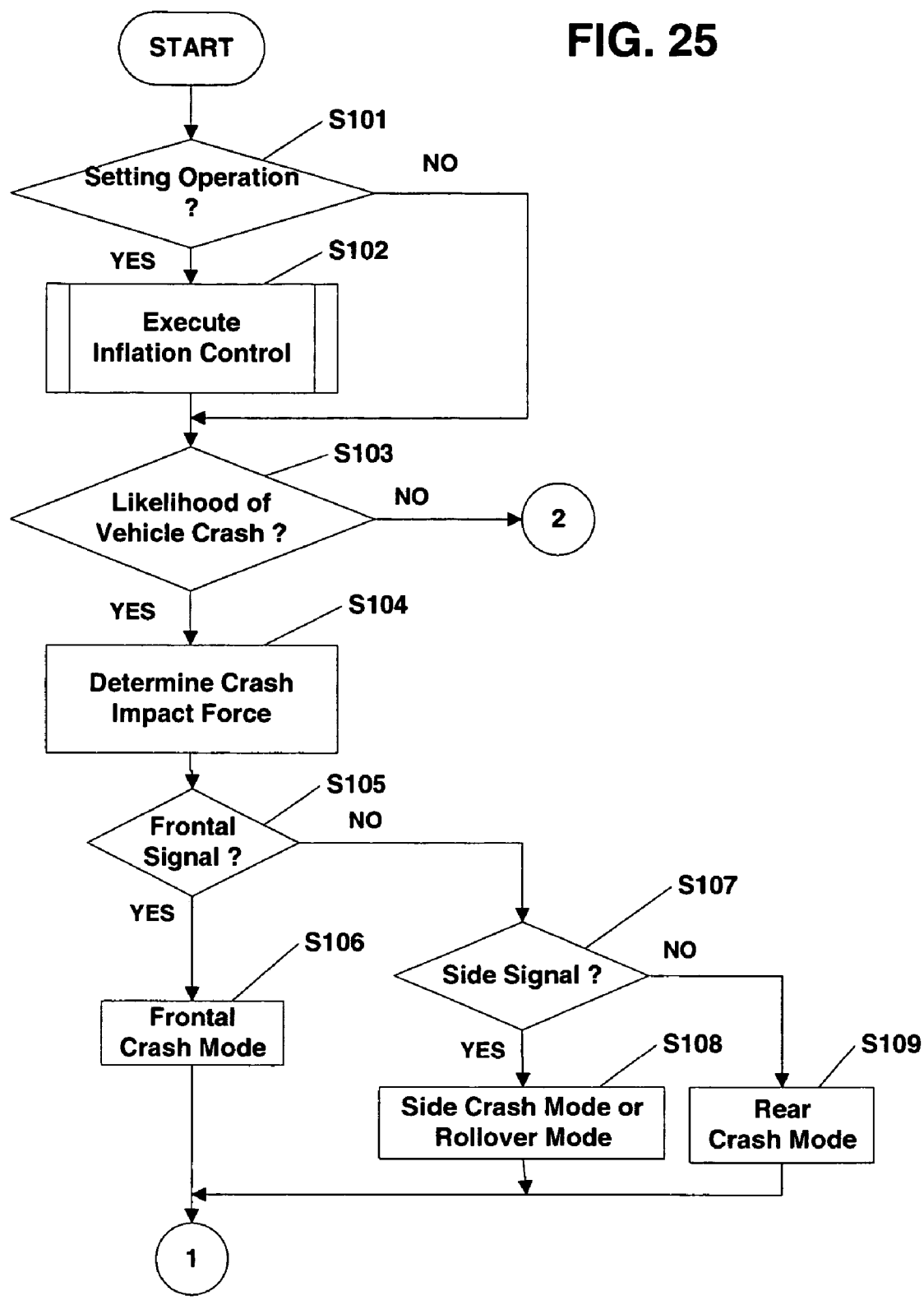
FIG. 25 is a flowchart of an early part of the control operation of the seat belt device for a vehicle according to the embodiment of the control unit.
Figure 26:
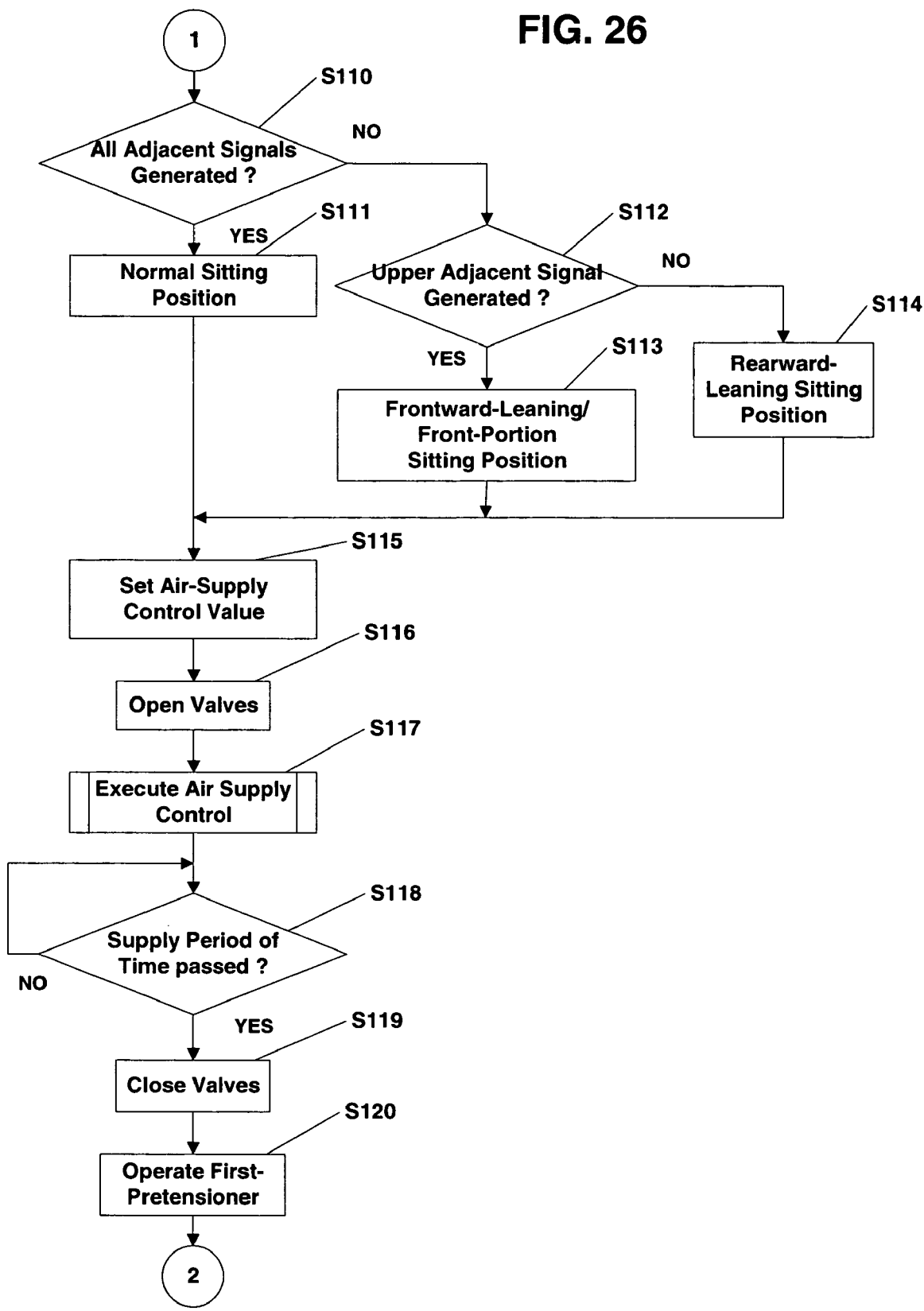
FIG. 26 is a flowchart of a middle part of the control operation of the seat belt device for a vehicle according to the embodiment of the control unit.
Figure 27:
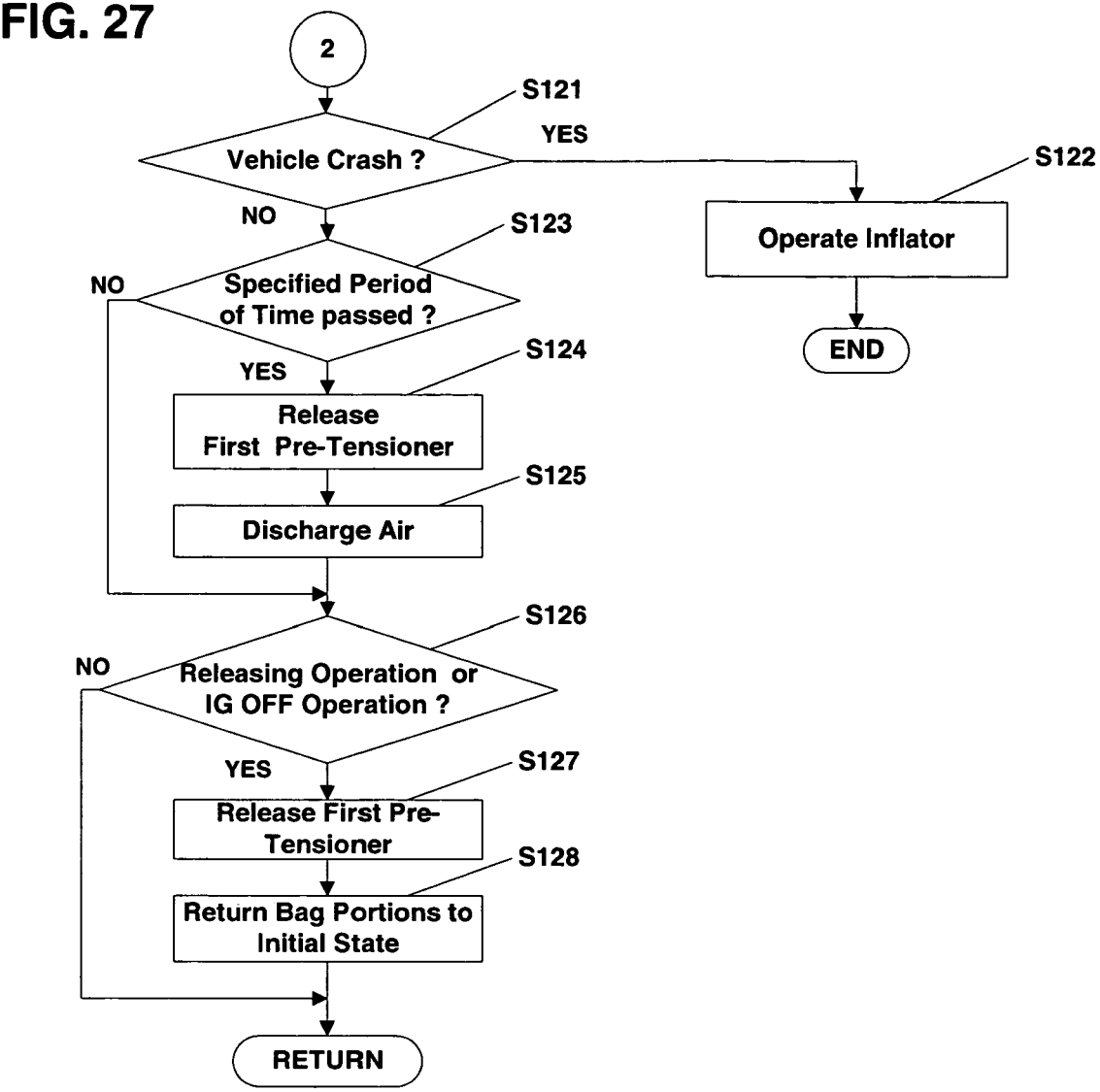
FIG. 27 is a flowchart of a later part of the control operation of the seat belt device for a vehicle according to the embodiment of the control unit.

The control operation executed by the control unit 105 of the seat belt device for a vehicle described above will be described referring to flowcharts of FIGS. 25 through 27. When the control operation starts, first it is determined whether or not the setting operation to inflate the bag portions 6a and 7a is made by the setting switch 36 (Step S101). When the answer is YES, the inflation control of the bag portions 6a and 7a is executed by the setting operation of the occupant by operating the blower resource 22 and by supplying the air to the bag portions 6a and 7a of the seat belt in the sate where the blower resource 22 of the blower device 3 is connected with the air supply passages 12 and 15 (Step S102). Next, it is determined whether or not the high likelihood of the vehicle crash is detected by the detecting device 126 (Step S103). When the answer is NO, the control sequence proceeds to step S121 described below.

Meanwhile, when the high likelihood of the vehicle crash is detected and the answer to step S103 is YES, the crash impact force is determined based on the relative distance and relative speed with another vehicle located and the like (Step S104). Then, it is determined whether or the detection of the high likelihood of the vehicle crash is conducted based on the detecting signal (front signal) of the front-distance detecting device 31 (Step S105). When the answer is YES, the vehicle crash detected mode is set at a frontal crash mode (Step S106).

Also, when the answer is NO to step S105, it is determined whether or the detection of the high likelihood of the vehicle crash is conducted based on the detecting signal (side signal) of the side-distance detecting device 33 (Step S107). When the answer is YES, the vehicle crash detected mode is set at a side crash mode or a rollover mode (Step S108). When the answer is NO to step S107 and then it is determined that the detection of the high likelihood of the vehicle crash is conducted based on the detecting signal (rear signal) of the rear-distance detecting device 32, the vehicle crash detected mode is set at a rear crash mode (Step S109).

Next, it is determined whether or not an adjacent signal showing that the distance between the back of the occupant and the seat back 1a of the seat 1 is short is generated from all of the seat sensors 51 through 53 in a state where the seat back 1a is in its upright position (Step S110). When the answer is YES, it is determined that the back of the occupant is in contact with an entire seat back 1a, and thus the current sitting position of the occupant is set at its normal sitting position (Step S111).

Meanwhile, when the answer to step S110 is NO, it is determined whether or not an away signal showing that the distance between the back of the occupant and the seat back 1a is long is generated from the seat sensors 51 located at the uppermost portion (Step S112). When the answer is YES, it is determined that the occupant is in a sitting position where the occupant sits leaning forward or in a front portion of the seat 1, and thus the current sitting position of the occupant is set at a forward-leaning/front-portion sitting position (Step S113). Also, when the answer to step S112 is NO, it is determined that the occupant is in a sitting position where the occupant sits leaning rearward, and thus the current sitting position of the occupant is set at a rearward-leaning sitting position (Step S114).

Then, the control value to control the air supply characteristics, namely the supply timing and the supply pressure of the air to be supplied to the bag portions 6a and 7a of the shoulder belt 6 and the lap belt 7 are obtained from a predetermined control map based on determination results of the above-described crash modes and sitting positions and the control value is set (Step S115).

Figures 28, 29:
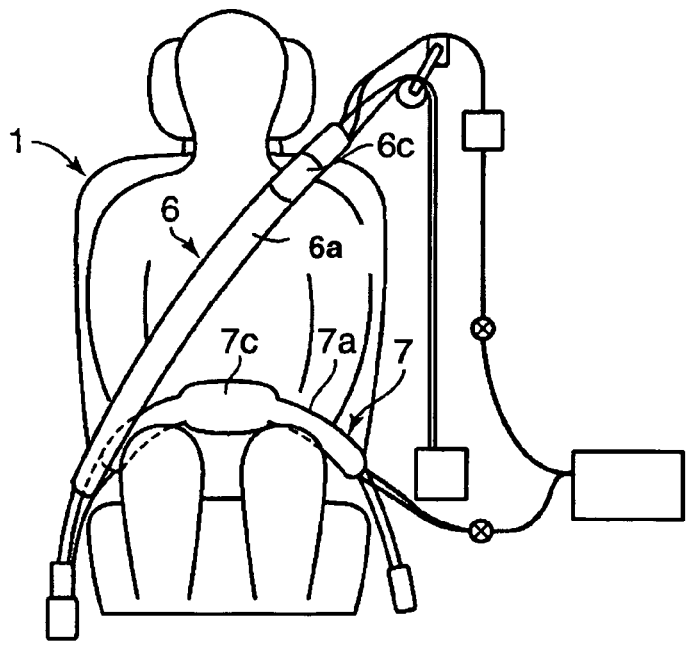
FIG. 28 is a chart showing another exemplified control map for the air supply.
FIG. 29 is an explanatory diagram of further another embodiment of the seat belt device for a vehicle according to the present invention.

The above-described control map is set, for example, as shown in FIG. 28, with a control parameter of the crash modes at the high likelihood of the vehicle crash detected by the detecting device 126 and the sitting positions of the occupant detected by the sitting-position detecting device 142. Herein, for example, when the occupant is in the normal sitting position and the crash mode is the frontal crash mode, the control value is set such that the control value S for the shoulder belt 6 is greater than the control value R for the lap belt 7. This means that the supply timing and the supply pressure of the air supplied to the bag portion 6a of the shoulder bag 6 is set at an earlier timing and a higher pressure than those of the air supplied to the bag portion 7a of the lap belt 7. Accordingly, when the high likelihood of the frontal vehicle crash is detected while the occupant is in the normal sitting position, the air is intensively supplied to the bag portion 6a of the shoulder belt 6.

Also, when the occupant is in the normal sitting position and the crash mode is the side crash mode or the rollover mode, the control value is set oppositely such that the control value S for the shoulder belt 6 is smaller than the control value R for the lap belt 7. Accordingly, when the side vehicle crash or the rollover of the vehicle are detected while the occupant is in the normal sitting position, the air is intensively supplied to the bag portion 7a of the lap belt 7. Further, when the occupant is in the normal sitting position and the crash mode is the rear crash mode, the control value is set such that the control value S for the shoulder belt 6 is equal to the control value R for the lap belt 7. Accordingly, the air is equally supplied to the bag portion 6a of the shoulder belt 6 and the bag portion 7a of the lap belt 7.

Meanwhile, when the occupant is in the above-described forward-leaning position or front-portion sitting position and the crash mode is the frontal crash mode, the control value is set such that the control value S for the shoulder belt 6 is extremely greater than the control value R for the lap belt 7. This means that the supply timing and the supply pressure of the air supplied to the bag portion 6a of the shoulder bag 6 is set at a much earlier timing and a much higher pressure than those of the air supplied to the bag portion 7a of the lap belt 7. Accordingly, when the high likelihood of the frontal vehicle crash is detected while the occupant is in the forward-leaning or front-portion sitting positions, the air is promptly and intensively supplied to the bag portion 6a of the shoulder belt 6.

Also, when the occupant is in the forward leaning or front-portion sitting positions and the crash mode is the side crash mode or the rollover mode, the control value is set such that the control value S for the shoulder belt 6 is equal to the control value R for the lap belt 7. Accordingly, the occupant can be restrained effectively by both shoulder belt 6 and the lap belt 7. Further, when the occupant is in the forward-leaning or front-portion sitting positions and the crash mode is the rear crash mode, the control value is set such that the control value S for the shoulder belt 6 is greater than the control value R for the lap belt 7. Accordingly, the air is intensively supplied to the bag portion 6a of the shoulder belt 6.

Meanwhile, when the occupant is in the rearward-leaning position and the crash mode is the frontal crash mode, the control value is set such that the control value S for the shoulder belt 6 is equal to the control value R for the lap belt 7. Accordingly, the air is equally supplied to the bag portion 6a of the shoulder belt 6 and the bag portion 7a of the lap belt 7. Also, when the occupant is in the rearward-leaning position and the crash mode is the side crash mode or the rollover mode, the control value is set such that the control value S for the shoulder belt 6 is extremely smaller than the control value R for the lap belt 7. Accordingly, the air is more promptly and intensively supplied to the bag portion 7a of the lap belt 7. Further, when the occupant is in the rearward-leaning sitting position and the crash mode is the rear crash mode, the control value is set such that the control value S for the shoulder belt 6 is smaller than the control value R for the lap belt 7. Accordingly, the air is intensively supplied to the bag portion 7a of the lap belt 7.

And, the control signal to open the valves 13 and 16 is generated by the valve control device 127 (Step S116), and the control signal to operate the blower device 3 and supply the air to the bag portions 6a and 7a of the seat belt is executed by the air supply control device 104 (Step S117). The air supply to the bag portions 6a and 7a of the belts 6 and 7 with the air supply timing and the air supply pressure which have been set in the above-described step S115 is executed.

Specifically, when the detecting signal of the high likelihood of vehicle crash is received from the detecting device 126, the switching valve 24 is controlled so as to connect the accumulator 23 of the blower device 3 with the air supply passages 12 and 15 and the pressured air is supplied to the bag portions 6a and 7a of the seat belt from the accumulator 23 via the air supply passages 12 and 15. And, when the predetermined supply period of time has passed thereafter, the switching valve 24 is controlled so as to connect the blower resource 22 of the blower device 3 with the air supply passages 12 and 15 and the rotational speed of the blower resource 22 is adjusted according to the crash impact force detected by the detecting device 126. Thus, the air supply control to the bag portions 6a and 7a of the seat belt is executed by the air supply control device 104.

Also, it is determined by the air supply control device 104 whether the condition for the air-supply stopping is satisfied or not by determining whether or not the predetermined supply period of time has passed after the air supply to the bag portions 6a and 7a had started (Step S118). When the passage of the predetermined period of time after the start of the air supply is determined and the answer to step S118 is YES, the control signal to close the valves 13 and 16 is generated from the valve control device 127 (Step S119) and the shoulder belt 6 is wound up by operating the first pre-tensioner 20 (Step S120).

Then, it is determined by the crash detecting device 141 whether the vehicle crash state is detected or not (Step S121). When the answer is YES, the operation instruction signal is supplied to the inflator 21 of the second pre-tensioner 18 and the inflator 21 is operated to wind up the shoulder belt 6 (Step S122). Then, the control operation ends. Meanwhile, when the answer to step S121 is NO, it is determined whether or not the predetermined specified period of time has passed after the high likelihood of vehicle crash had been detected by the detecting device 126 (Step S123). This specified period of time is set at a proper period of time which can determine whether the vehicle crash is avoided or not after the detection of the high likelihood of vehicle crash.

When the answer to step S123 is YES, the winding state of the shoulder belt 6 by the first pre-tensioner 17 is released and the tension of the belt is returned to its initial state (Step S124). Then, the valves 13 and 16 are opened and the air is discharged from the bag portions 6a and 7a of the seat belt, and thereby the control to return the bag portions 6a and 7a to the initial state is executed (Step S125). Namely, the control to adjust the air pressure in the bag portions 6a and 7a to the setting pressure set by the setting switch 36 is executed by the air supply control device 104 by operating the blower resource 22 reversely and discharging the air from the bag portions 6a and 7a with the switching valve 24 connecting the blower resource 22 of the blower device 3 with the air supply passages 12 and 15.

Next, it is determined whether or not the releasing operation of the seat belt or the OFF operation of the ignition key switch (IG) is done (Step S126). When the answer is YES, the winding state of the shoulder belt 6 by the first pre-tensioner 17 is released and thereby the tension of the seat belt is returned to the initial state (Step S127). And, the valves 13 and 16 are opened and the air is discharged from the bag portions 6a and 7a of the seat belt, and thereby the control to return the bag portions 6a and 7a to the initial state is executed (Step S128). Then, the control sequence returns.

According to the embodiment described above, there is provided the vehicle-state detecting device 125 operative to detect the state of the vehicle, and the air supply control device 104 is constituted so as to control the characteristic of air supply to the bag portions 6a and 7a of the shoulder belt 6 and the lap belt 7 according to the vehicle state detected by the vehicle-state detecting device 125. Accordingly, since the bag portions 6a and 7a is inflated respectively at the proper timing at need, the pressing force of the bag portions can be dispersed to the large extent and uniformly so as to protect the occupant properly by the seat belt.

For example, as described the above embodiment, when the high likelihood of the vehicle crash is detected by the detecting device 126, the frontal crash mode is detected and the normal sitting position of the occupant is detected, the air supply timing and the air supply pressure to the bag portion 6a of the shoulder belt 6 are controlled so as to be earlier and higher than those to the bag portion 7a of the lap belt 7 based on FIG. 28. Thus, the air can be supplied intensively to the bag portion 6a of the shoulder belt 6 and the bag portions 6a can inflated promptly. Accordingly, even if the air supply capacity by the blower device 3 is restricted, the bag portions 6a of the shoulder belt 6 can be pressed against the occupant to the properly large extent, and thereby the shoulder and chest of the occupant can be restrained effectively without giving any uncomfortable feeling to the occupant in the normal sitting position.

Also, when the occupant is in the normal sitting position and the crash mode is the side crash mode or the rollover mode, the air supply timing and the air supply pressure to the bag portion 7a of the lap belt 7 are controlled so as to be earlier and higher than those to the bag portion 6a of the shoulder belt 6, and thereby the air is supplied intensively to the bag portion 7a of the lap belt 7 and the bag portion 7a is inflated promptly. Accordingly, the impact load which would act so as to move the occupant sitting in the normal position laterally in the side crash mode or the rollover mode can be supported by the lap belt 7 properly. Further, when the occupant is in the normal sitting position and the crash mode is the rear crash mode, the air is equally supplied to the bag portion 6a of the shoulder belt 6 and the bag portion 7a of the lap belt 7 and these bag portions are inflated at the same time. Accordingly, the impact load which would act so as to move the occupant sitting in the normal position rearward can be supported by both the shoulder belt 6 and the lap belt 7 effectively.

Meanwhile, when the occupant is in the forward-leaning position or front-portion sitting position and the crash mode is the frontal crash mode, the air supply timing and the air supply pressure to the bag portion 6a of the shoulder belt 6 are controlled so as to be extremely earlier and higher than those to the bag portion 7a of the lap belt 7, and thereby the bag portion 6a of the shoulder belt 6 is inflated promptly. Accordingly, the impact load which would act so as to move the occupant sitting in the forward-leaning position or front-portion sitting position forward in the frontal crash can be supported by the shoulder belt 6 effectively.

Also, when the occupant is in the forward leaning or front-portion sitting positions and the crash mode is the side crash mode or the rollover mode, the air is equally supplied to the bag portion 6a of the shoulder belt 6 and the bag portion 7a of the lap belt 7. Accordingly, the impact load which would act so as to move the occupant sitting in the above-described position laterally in the side crash mode or the rollover mode can be supported by both the shoulder belt 6 and the lap belt 7 effectively. Further, when the occupant is in the forward-leaning or front-portion sitting positions and the crash mode is the rear crash mode, the air supply timing and the air supply pressure to the bag portions 6a of the shoulder belt 6 are controlled so that the air can be supplied intensively to the bag portion 6a. Accordingly, the impact load which would act so as to move the occupant sitting in the above-described position rearward can be supported by the shoulder belt 6 effectively.

Meanwhile, when the occupant is in the rearward-leaning position and the crash mode is the frontal crash mode, the air is equally supplied to the bag portion 6a of the shoulder belt 6 and the bag portion 7a of the lap belt 7 so as to inflate these bag portions at the same time. Accordingly, the impact load which would act so as to move the occupant sitting in the rearward-leaning position forward can be supported by both the shoulder belt 6 and the lap belt 7 effectively.

Also, when the occupant is in the rearward-leaning position and the crash mode is the side crash mode or the rollover mode, the air supply timing and the air supply pressure to the bag portion 7a of the lap belt 7 are controlled so that the air can be supplied more promptly and intensively to the bag portion 7a. Accordingly, the impact load which would act so as to move the occupant sitting in the above-described position laterally can be supported by the lap belt 7 effectively. Further, when the occupant is in the rearward-leaning sitting position and the crash mode is the rear crash mode, the air supply timing and the air supply pressure to the bag portion 7a of the lap belt 7 are controlled so that the air can be supplied intensively to the bag portion 7a. Accordingly, the impact load which would act so as to move the occupant sitting in the above-described position rearward can be supported by the lap belt 7 effectively.

According to the above-described embodiment, since the bag portions 6a provided at the shoulder belt 6 is constituted so as to be inflated by the supplied air from the blower device 3 in such a manner that the thickness thereof increases, the cushion function can be provided by the bag portion 6a of the shoulder belt 6 when the high likelihood of the vehicle crash detected by the detecting device 126 or the like. Accordingly, the shoulder belt 6 can be prevented from being pressed intensively against the shoulder and chest of the occupant, and thereby the occupant can be protected effectively by the shoulder belt 6 without giving the uncomfortable feeling to the occupant.

Particularly, in the case where the increased thickness of the bag portions 6a by the air from the blower device 3 is constituted such that the thickness of the bag portion 6c located at the shoulder of the occupant is greater than that of the other portion of the bag portions 6a as illustrated in FIG. 29, that portion 6c is inflated greatly and promptly. Accordingly, the occupant can be properly and effectively restrained and protected, preventing the improperly large restraint force from acting on the occupant's shoulder.

According to the above-described embodiment, since the bag portion 7a provided at the lap belt 7 is constituted so as to be inflated by the supplied air from the blower device 3 in such a manner that the width increases, the contact area of the bag portion 7a of the lap belt 7 can be increased when the high likelihood of the vehicle crash detected by the detecting device 126 or the like. Accordingly, the occupant can be effectively protected by the lap belt 7, without giving any uncomfortable feeling to the occupant due to the improperly large restraint force acting on the occupant's stomach and shoulder.

Particularly, in the case where the increased width of the bag portion 7a of the lap belt 7 by the air from the blower device 3 is constituted such that the width of the bag portion 7c located at the stomach of the occupant is greater than that of the other portion of the bag portion 7 provided at the lap belt 7 as illustrated in FIG. 29, that portion 7c is inflated greatly and promptly. Accordingly, the occupant can be properly and effectively restrained and protected, preventing the improperly large restraint force from acting on the occupant's stomach.

Instead of the above-described embodiment in which the air supply characteristic to the bag portions 6a and 7a of the seat belts is controlled according to the crash mode detected by the detecting device 126 and the occupant sitting position on the seat 1 detected by the sitting-position detecting device 142, that air supply characteristic may be controlled according to a driving sate of the vehicle detected by a vehicle driving-state detecting device 143 of the vehicle-state detecting device 125. For example, it is determined by the vehicle driving-state detecting device 143 whether or not the vehicle is in a driving state of sharp driving curve or gentle curb or whether or not the vehicle is in a driving state of steep slope or gentle slope, and the air supply characteristic to the bag portions 6a and 7a may be controlled based on there results.

Figure 30:
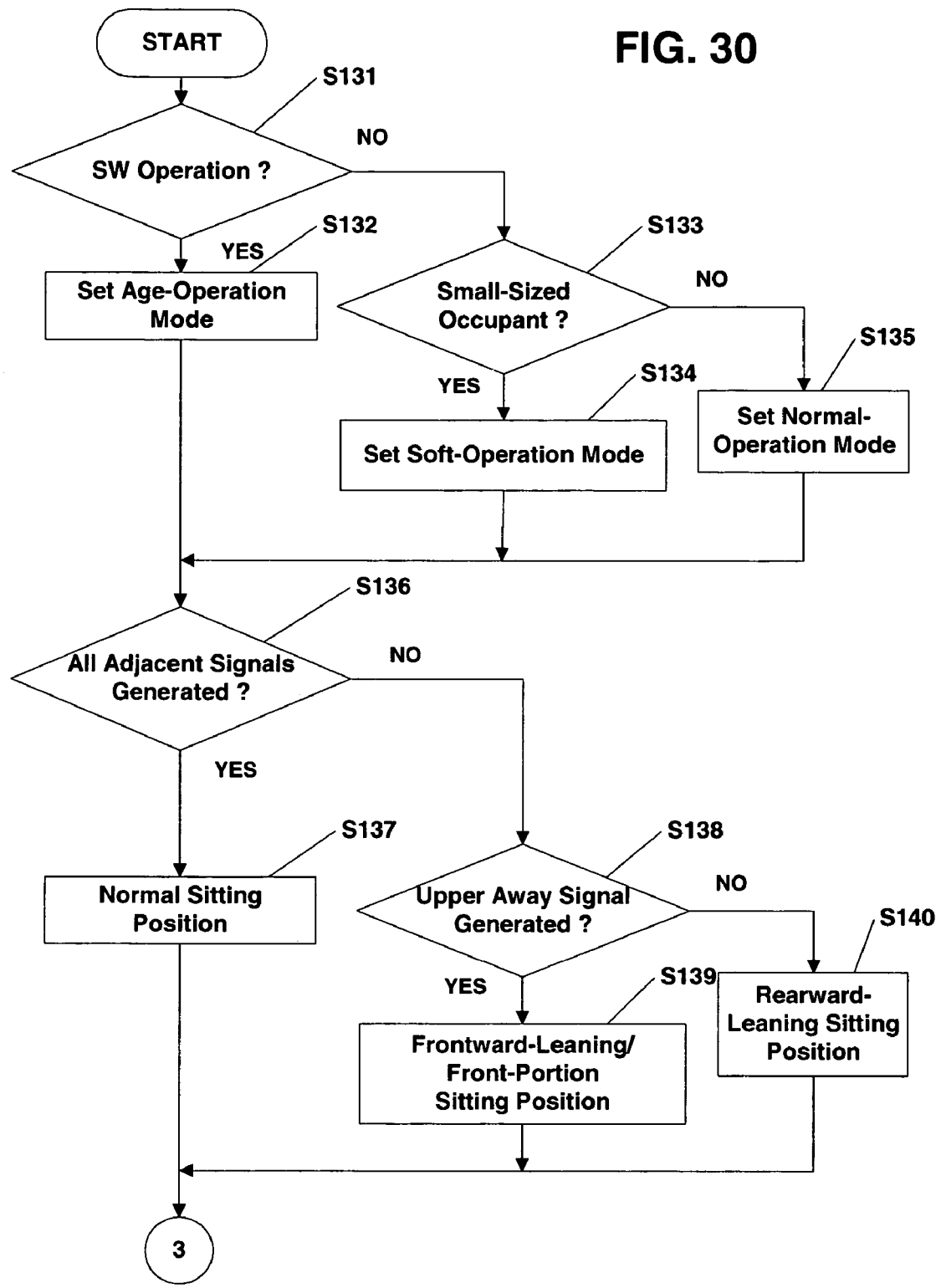
FIG. 30 is a flowchart of a first half of the control operation of the seat belt device for a vehicle according to further another embodiment of the control unit.
Figure 31:
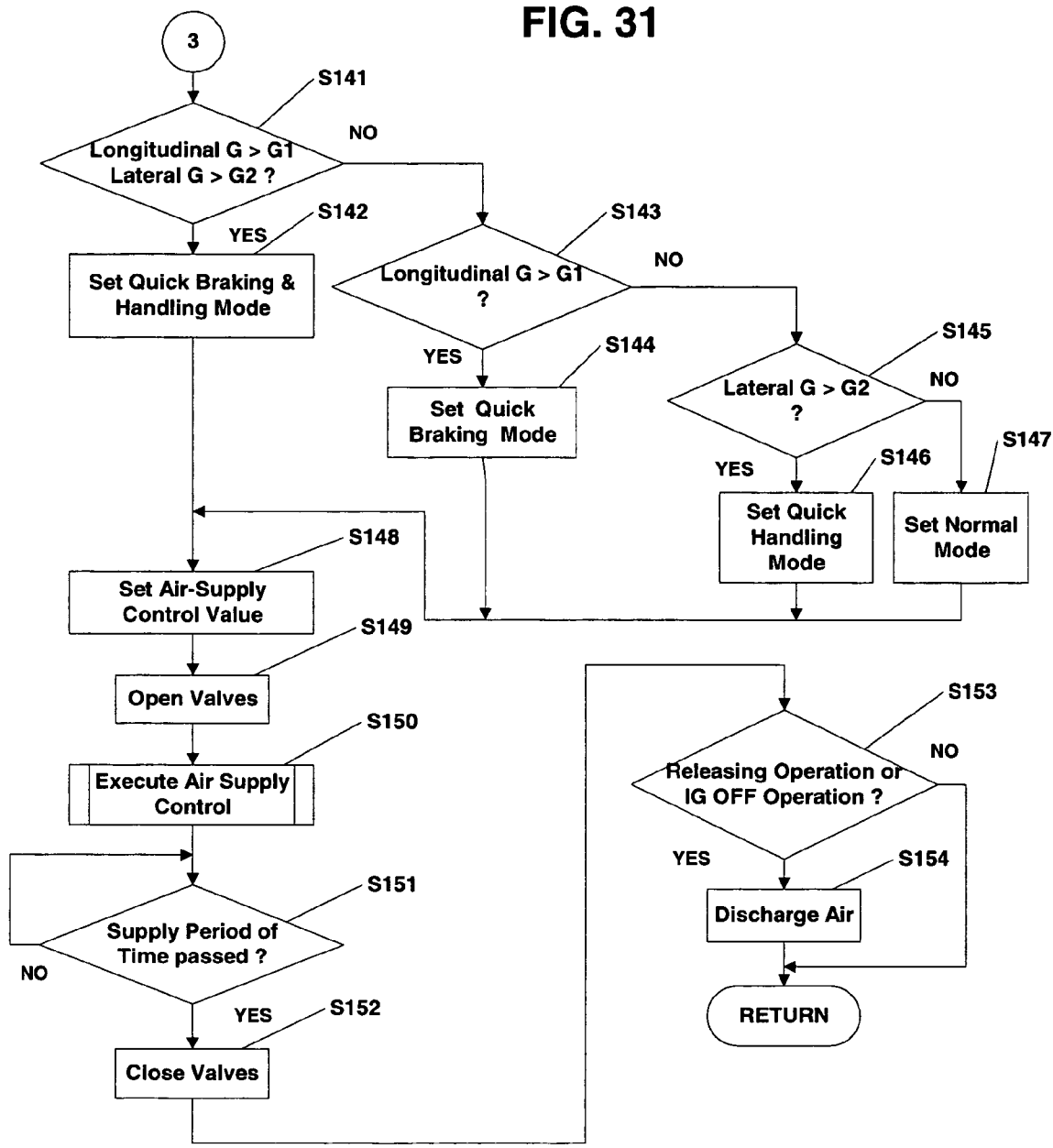
FIG. 31 is a flowchart of a second half of the control operation of the seat belt device for a vehicle according to the embodiment of the control unit.

The control operation of the above-described embodiment will be described referring to flowcharts of FIGS. 30 and 31. After this control operation starts, at first it is determined whether or not an input switch SW of an age mode provided at the setting switch 36 is operated (Step S131). Then, when the answer is YES, an age-operation mode is set as the air-supply control characteristic (Step S132). When the answer to step S131 is NO, it is determined based on a detecting signal of a pressure sensor provided at the seat 1 or the like whether or not the occupant sitting on the seat 1 is a small-sized person like a child (Step S133). When the answer is YES, a soft-operation mode is set as the air-supply control characteristic (Step S134).

When the answer to the step S133 is NO, a normal-operation mode is set as the air-supply control characteristic (Step S135), and then it is determined whether or not an adjacent signal showing that the distance between the back of the occupant and the seat back 1a of the seat 1 is short is generated from all of the seat sensors 51 through 53 in a state where the seat back 1a is in its upright position (Step S136). When the answer is YES, it is determined that the back of the occupant is in contact with an entire seat back 1a, and thus the current sitting position of the occupant is set at its normal sitting position (Step S137).

Meanwhile, when the answer to step S136 is NO, it is determined whether or not an away signal showing that the distance between the back of the occupant and the seat back 1a is long is generated from the seat sensors 51 located at the uppermost portion (Step S138). When the answer is YES, it is determined that the occupant is in a sitting position where the occupant sits leaning forward or in a front portion of the seat 1, and thus the current sitting position of the occupant is set at a forward-leaning/front-portion sitting position (Step S139). Also, when the answer to step S138 is NO, it is determined that the occupant is in a sitting position where the occupant sits leaning rearward, and thus the current sitting position of the occupant is set at a rearward-leaning sitting position (Step S140).

Next, it is determined whether or not a longitudinal G detected by the longitudinal G sensor 134 and a lateral G detected by the lateral G sensor 135 are respectively greater than thresholds G1 and G2 (Step S141). When the driving state with the greater longitudinal G and lateral G where the driver uses frequent and quick braking and handling operations is detected and thereby the answer to step S141 is YES, the driving mode is set at a quick braking-and-handling mode (Step S142).

When the answer to step S141 is NO, it is determined whether the longitudinal G is greater than the threshold G1 or not (Step S143). When the driving state with the greater longitudinal G where the driver uses the frequent and quick braking operation is detected and thereby the answer to step S143 is YES, the driving mode is set at a quick braking mode (Step S144).

When the answer to step S143 is NO, it is determined whether the lateral G is greater than the threshold G2 or not (Step S145). When the driving state with the greater lateral G where the driver uses the frequent and quick handling operation is detected and thereby the answer to step S145 is YES, the driving mode is set at a quick handling mode (Step S146). Also, when the driving state with no frequent and quick braking and handling operations is detected and thereby the answer to step S145 is NO, the driving mode is set at a normal mode (Step S147).

Herein, the above-described thresholds G1 and G2 are adjustable according to the air supply characteristic set in steps S132, S134 and S135 in such a manner that they are set at the maximum values in the normal-operation mode; the medium values in the soft-operation mode; and the minimum values in the age-operation mode.

Then, the control value to control the air supply characteristics, namely the supply timing and the supply pressure of the air to be supplied to the bag portions 6a and 7a of the shoulder belt 6 and the lap belt 7 are obtained from a predetermined control map based on determination results of the above-described driving modes and sitting positions and the control value is set (Step S148).

The above-described control map is set, for example, as shown in FIG. 32, with a control parameter of the driving modes detected by the driving-state detecting device 143 and the sitting positions of the occupant detected by the sitting-position detecting device 142. Herein, for example, when the occupant is in the normal sitting position and the driving mode is the quick braking and handling mode, the control value is set such that the control value S for the shoulder belt 6 is equal to the control value R for the lap belt 7. This means that the supply timing and the supply pressure of the air supplied to the bag portion 6a of the shoulder bag 6 is set at the same as those of the air supplied to the bag portion 7a of the lap belt 7. Accordingly, the air is equally supplied to the bag portion 6a of the shoulder belt 6 and the bag portion 7a of the lap belt 7, and thereby the occupant receiving the large longitudinal G and lateral G can be effectively protected by both the shoulder belt 6 and the lap belt 7.

Also, when the occupant is in the normal sitting position and the driving mode is the quick braking mode, the control value is set such that the control value S for the shoulder belt 6 is greater than the control value R for the lap belt 7. This means that the supply timing and the supply pressure of the air supplied to the bag portion 6a of the shoulder bag 6 is set earlier and greater than those of the air supplied to the bag portion 7a of the lap belt 7. Accordingly, the air is intensively supplied to the bag portion 6a of the shoulder belt 6, and thereby the occupant receiving the large longitudinal G in the normal sitting position can be effectively protected by both the shoulder belt 6.

Further, when the occupant is in the normal sitting position and the driving mode is the quick handling mode, the control value is set such that the control value S for the shoulder belt 6 is smaller than the control value R for the lap belt 7. Accordingly, the air is intensively supplied to the bag portion 7a of the lap belt 7, and thereby the occupant receiving the large lateral G in the normal sitting position can be effectively protected by both the lap belt 7.

Meanwhile, when the occupant is in the forward-leaning position or front-portion sitting position and the driving mode is the quick braking and handling mode, the control value is set such that the control value S for the shoulder belt 6 is greater than the control value R for the lap belt 7. This means that the supply timing and the supply pressure of the air supplied to the bag portion 6a of the shoulder bag 6 is set earlier and greater than those of the air supplied to the bag portion 7a of the lap belt 7. Accordingly, the air is quickly and intensively supplied to the bag portions 6a of the shoulder belt 6, and thereby the occupant receiving the large longitudinal G and lateral G in the forward-leaning position or front-portion sitting position can be effectively protected by the shoulder belt 6.

Also, when the occupant is in the forward-leaning or front-portion sitting positions and the driving mode is the quick braking mode, the control value is set such that the control value S for the shoulder belt 6 is extremely greater than the control value R for the lap belt 7. Accordingly, the air is promptly and intensively supplied to the bag portion 6a of the shoulder belt 6. Accordingly, the occupant receiving the large longitudinal G in the forward-leaning position or front-portion sitting position can be effectively protected by the shoulder belt 6.

Further, when the occupant is in the forward-leaning or front-portion sitting positions and the driving mode is the quick handling mode, the control value is set such that the control value S for the shoulder belt 6 is equal to the control value R for the lap belt 7. Thereby, the air is equally supplied to both the bag portion 6a of the shoulder belt 6 and the bag portion 7a of the lap belt 7. Accordingly, the occupant receiving the large lateral G can be effectively protected by both the shoulder belt 6 and the lap belt 7.

Meanwhile, when the occupant is in the rearward-leaning position and the driving mode is the quick braking and handling mode, the control value is set such that the control value S for the shoulder belt 6 is smaller than the control value R for the lap belt 7. Thereby, the air is intensively supplied to both the bag portion 7a of the lap belt 7. Accordingly, the occupant receiving the large longitudinal G and lateral G in the rearward-leaning position can be effectively protected by the lap belt 7.

Also, when the occupant is in the rearward-leaning position and the driving mode is the quick braking mode, the control value is set such that the control value S for the shoulder belt 6 is equal to the control value R for the lap belt 7. Thereby, the air is equally supplied to both the bag portion 6*a* of the shoulder belt 6 and the bag portion 7*a* of the lap belt 7. Accordingly, the occupant can be effectively protected by both the shoulder belt 6 and the lap belt 7.

Further, when the occupant is in the rearward-leaning sitting position and the driving mode is the quick handling mode, the control value is set such that the control value S for the shoulder belt 6 is extremely smaller than the control value R for the lap belt 7. Accordingly, the air is promptly and intensively supplied to the bag portion 7*a* of the lap belt 7, and thereby the occupant receiving the large lateral G in the rearward-leaning sitting position can be protected.

Herein, when it is determined by the driving-state detecting device 143 that the driving mode is the normal mode, the respective control values R and S for the shoulder belt 6 and the lap belt 7 are set zero respectively regardless of the sitting position of the occupant so as to stop the air supply to these belts.

And, the control signal to open the valves 13 and 16 is generated by the valve control device 127 (Step S149), and the control signal to operate the blower device 3 and supply the air to the bag portions 6*a* and 7*a* of the seat belt is executed by the air supply control device 104 (Step S150). The air supply to the bag portions 6*a* and 7*a* of the belts 6 and 7 with the air supply timing and the air supply pressure which have been set in the above-described step S148 is executed.

Specifically, when the detecting signal of the high likelihood of vehicle crash is received from the detecting device 126, the switching valve 24 is controlled so as to connect the accumulator 23 of the blower device 3 with the air supply passages 12 and 15 and the pressured air is supplied to the bag portions 6*a* and 7*a* of the seat belt from the accumulator 23 via the air supply passages 12 and 15 at the specified timing, respectively. And, the switching valve 24 is controlled so as to connect the blower resource 22 of the blower device 3 with the air supply passages 12 and 15, and the rotational speed of the blower resource 22 is adjusted according to the air supply pressure which is set based on the driving mode detected by the driving-state detecting device 143 and the occupant sitting position detected by the sitting-position detecting device 142. Thus, the air supply control to the bag portions 6*a* and 7*a* of the seat belt is executed by the air supply control device 104.

Also, it is determined by the air supply control device 104 whether the condition for the air-supply stopping is satisfied or not by determining whether or not the predetermined supply period of time has passed after the air supply to the bag portions 6*a* and 7*a* had started (Step S51). When the passage of the predetermined period of time after the start of the air supply is determined and the answer to step S51 is YES, the control signal to close the valves 13 and 16 is generated from the valve control device 127 (Step S52).

Then, it is determined whether or not either a releasing operation of the seat belt or an OFF operation of an ignition key switch (IG) is done (Step S53). When the answer is YES, the valves 13 and 16 are opened and thereby the air in the bag portions 6*a* and 7*a* of the seat belt is discharged (Step S154), and then the control sequence returns after this returning the bag portions 6*a* and 7*a* to their initial states.

As described above, since the air supply timing and supply pressure to the bag portions 6*a* and 7*a* of the shoulder belt 6 and the lap belt 7 from the blower device 3 are controlled according to the vehicle driving state detected by the driving-state detecting device 143 of the vehicle-state detecting device 125, the bag portions 6*a* and 7*a* can be inflated properly according to the vehicle driving state. Thereby, the occupant can be effectively protected by the shoulder belt 6 and the lap belt 7, without giving the uncomfortable feeling to the occupant.

Herein, the determination as to whether or the vehicle is in the driving state of sharp driving curve or gentle curb or whether or not the vehicle is in the driving state of steep slope or gentle slope may be conducted based on detecting signals of the acceleration sensor to detect the vehicle acceleration and the steering angle sensor to detect the steering angle of the steering wheel, the yaw ratio sensor to detect the vehicle yaw ratio and the vehicle speed sensor to detect the vehicle speed, or the like. And, the air supply control may be executed by the air supply control device 104 to which the above-described detecting signals are supplied.

The present invention should not be limited to the above-described embodiments, but any other modifications and improvements may be applied within the scope of a sprit of the present invention.

What is claimed is:

1. A seat belt device for a vehicle, comprising:
   an inflatable bag portion provided at a seat belt for protecting an occupant and adapted to receive inflation air;
   a blower device operative to repeatedly supply the inflation air to said bag portion;
   an air supply passage connecting said bag portion with said blower device;
   an air supply control device operative to supply the inflation air from said blower device to said bag portion so as to inflate said bag portion and discharge the supplied air from the bag portion so as to return said bag portion to a deflated initial state, whereby an inflation operation of said inflatable bag portion can be reused;
   a detecting device operative to detect a high likelihood of an occurrence of vehicle crash, wherein the inflation air is supplied to said bag portion to inflate said bag portion when the high likelihood of the occurrence of vehicle crash is detected by said detecting device;
   a valve which is provided at said air supply passage, and a valve control device operative to control said valve so as to open and shut the air supply passage according to a control condition; and
   a vehicle-crash detecting device operative to detect a real occurrence of vehicle crash, wherein said valve is controlled so as to shut the air supply passage when the real occurrence of vehicle crash has been detected by said vehicle-crash detecting device after a supply of the inflation air to said bag portion had started.

2. The seat belt device for a vehicle of claim 1, wherein said valve is controlled so as to shut the air supply passage when a specified supply period of time has passed after a supply of the inflation air to said bag portion had started.

3. The seat belt device for a vehicle of claim 1, further comprising a pressure sensor to detect an air pressure in said bag portion, wherein said valve is controlled so as to shut the air supply passage when the pressure sensed by said pressure sensor has reached a specified pressure after a supply of the inflation air to said bag portion had started.

4. The seat belt device for a vehicle of claim 1, wherein after the inflation air has been supplied to the bag portion, a pressure of the inflation air in the bag portion is adjusted to a specified pressure value.

5. The seat belt device for a vehicle of claim 4, wherein said blower device comprises a blower resource operative to pressure air and provide the inflation air and an accumulator operative to accumulate the pressured inflation air, and the pressured inflation air in said accumulator is supplied to said bag portion when the high likelihood of the occurrence of vehicle crash is detected by said detecting device.

6. The seat belt device for a vehicle of claim 1, wherein a pressure of the inflation air supplied to said bag portion from said blower device is adjusted according to a vehicle state.

7. The seat belt device for a vehicle of claim 1, wherein when there occurs no real vehicle crash within a specified period of time after the inflation air is supplied to said bag portion, the supplied air is discharged from the bag portion so as to return said bag portion to the deflated initial state.

8. The seat belt device for a vehicle of claim 1, wherein at least when said seat belt applied to the occupant is removed or an ignition key switch of the vehicle is turned off, the supplied air is discharged from the bag portion so as to return said bag portion to the deflated initial state.

9. The seat belt device for a vehicle of claim 1, wherein said bag portion comprises a plurality of bags which are provided so as to extend in a longitudinal direction of the seat belt respectively and be separate from each other in a width direction of the seat belt.

10. The seat belt device for a vehicle of claim 9, wherein part of said air supply passage is disposed inside said bag portion.

11. The seat belt device for a vehicle of claim 9, wherein said bag portion is configured so as to inflate toward the occupant.

12. The seat belt device for a vehicle of claim 9, wherein said bag portion is configured so as to inflate toward both sides in a thickness direction thereof.

13. The seat belt device for a vehicle of claim 9, wherein said bag portion further comprises a connection portion which interconnects said bags, and said connection portion is configured so as to be inflated by the supplied air having a specified pressure which is higher than a pressure of the inflation air for inflating said bags.

14. The seat belt device for a vehicle of claim 13, wherein said connection portion is configured so as to inflate toward the occupant from a initial deflated state thereof.

15. The seat belt device for a vehicle of claim 13, wherein said connection portion is configured so as to inflate toward both sides in a thickness direction thereof.

16. The seat belt device for a vehicle of claim 1, wherein part of said air supply passage is disposed inside said bag portion, said part of the air supply passage comprises a plurality of air holes to supply the air into the bag portion, and said air holes are provided along a longitudinal direction of the bag portion.

17. The seat belt device for a vehicle of claim 16, wherein said part of the air supply passage is disposed along the longitudinal direction of the bag portion.

18. The seat belt device for a vehicle of claim 16, wherein said part of the air supply passage is located inside said bag portion.

19. The seat belt device for a vehicle of claim 16, wherein said part of the air supply passage comprises two passages which are separately disposed at both ends in said bag portion, and said air holes are provided at said two passages respectively.

20. The seat belt device for a vehicle of claim 16, wherein said part of the air supply passage includes a substantially circular cross section.

21. The seat belt device for a vehicle of claim 16, wherein said seat belt comprises a shoulder belt and a lap belt, and said bag portion is provided at said shoulder belt and lap belt, respectively.

22. The seat belt device for a vehicle of claim 1, wherein an amount of the seat belt wound up by said pre-tensioner is adjusted according to an amount of the air supplied to said bag portion.

23. The seat belt device for a vehicle of claim 1, wherein an amount of an operation to restrain the occupant by said occupant restraint device is adjusted according to an amount of the air supplied to said bag portion and an amount of the seat belt wound up by said pre-tensioner.

24. The seat belt device for a vehicle of claim 1, wherein when there occurs no real vehicle crash within a specified period of time after the inflation air is supplied to said bag portion, the supplied air is discharged from the bag portion so as to return said bag portion to the deflated initial state.

25. A seat belt device for a vehicle, comprising:

an inflatable bag portion provided at a seat belt for protecting an occupant and adapted to receive inflation air;

a blower device operative to repeatedly supply the inflation air to said bag portion;

an air supply passage connecting said bag portion with said blower device;

an air supply control device operative to supply the inflation air from said blower device to said bag portion so as to inflate said bag portion and discharge the supplied air from the bag portion so as to return said bag portion to a deflated initial state, whereby an inflation operation of said inflatable bag portion can be reused; and a detecting device operative to detect a high likelihood of an occurrence of vehicle crash, a vehicle-crash detecting device operative to detect a real occurrence of vehicle crash, a pre-tensioner operative to wind up the seat belt, and an occupant restraint device operative to restrain the occupant, wherein when the high likelihood of the occurrence of vehicle crash is detected by said detecting device, the inflation air is supplied to said bag portion to inflate said bag portion and the seat belt is wound up by said pre-tensioner, and when the real occurrence of vehicle crash is detected, the occupant is restrained by said occupant restraint device;

wherein when said high likelihood of the occurrence of vehicle crash is detected by said detecting device, at first the inflation air is supplied to said bag portion to inflate said bag portion and then the seat belt is wound up by said pre-tensioner.

26. A seat belt device for a vehicle, comprising:

an inflatable bag portion provided at a seat belt for protecting an occupant and adapted to receive inflation air;

a blower device operative to repeatedly supply the inflation air to said bag portion;

an air supply passage connecting said bag portion with said blower device;

an air supply control device operative to supply the inflation air from said blower device to said bag portion so as to inflate said bag portion and discharge the supplied air from the bag portion so as to return said bag portion to a deflated initial state, whereby an inflation operation of said inflatable bag portion can be reused;

a detecting device operative to detect a high likelihood of an occurrence of vehicle crash, a vehicle-crash detecting device operative to detect a real occurrence of vehicle crash, a pre-tensioner operative to wind up the seat belt, and an occupant restraint device operative to restrain the occupant, wherein when the high likelihood of the occurrence of vehicle crash is detected by said detecting device, the inflation air is supplied to said bag portion to inflate said bag portion and the seat belt is wound up by said pre-tensioner, and when the real occurrence of vehicle crash is detected, the occupant is restrained by said occupant restraint device; and a failsafe detecting device operative to detect a malfunction of said air supply, wherein when the malfunction of the air supply is detected by said failsafe detecting device, an operation of the belt winding by said pre-tensioner is changed to a manner different from that at an initial state.

* * * * *